(12) United States Patent
Pursifull et al.

(10) Patent No.: US 9,822,718 B2
(45) Date of Patent: Nov. 21, 2017

(54) SYSTEM AND METHOD FOR CONTROLLING CANISTER PURGING

(71) Applicant: Ford Global Technologies, LLC, Dearborn, MI (US)

(72) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 14/691,375

(22) Filed: Apr. 20, 2015

(65) Prior Publication Data

US 2016/0305352 A1    Oct. 20, 2016

(51) Int. Cl.

| F02D 41/00 | (2006.01) |
|---|---|
| F02M 25/08 | (2006.01) |
| F02M 35/10 | (2006.01) |
| F02M 35/104 | (2006.01) |
| F02B 37/12 | (2006.01) |
| F02B 29/04 | (2006.01) |
| F02B 33/00 | (2006.01) |

(52) U.S. Cl.
CPC .......... *F02D 41/004* (2013.01); *F02B 37/127* (2013.01); *F02D 41/0007* (2013.01); *F02D 41/0045* (2013.01); *F02M 25/089* (2013.01); *F02M 25/0836* (2013.01); *F02M 35/104* (2013.01); *F02M 35/10222* (2013.01); *F02B 29/0406* (2013.01); *F02B 33/00* (2013.01); *F02M 35/10229* (2013.01)

(58) Field of Classification Search
CPC ............. F02M 25/0836; F02M 25/089; F02M 25/0854; F02M 25/0809; F02M 25/0872; F02M 25/0818; F02M 25/08; F02M 2025/0881; F02D 41/004; F02D 41/0032; F02D 41/003; F02D 41/0042; F02D 2250/41; F02D 41/0045
USPC .......... 123/516, 518, 519, 520, 521
See application file for complete search history.

(56) References Cited

U.S. PATENT DOCUMENTS

| 5,005,550 A | 4/1991 | Bugin, Jr. et al. |
| 6,196,203 B1 | 3/2001 | Grieve et al. |
| (Continued) | | |

FOREIGN PATENT DOCUMENTS

| DE | 102011084539 B3 | 12/2012 |
| DE | 102011086938 A1 | 5/2013 |

OTHER PUBLICATIONS

Pursifull, R. et al. "System and Method for Canister Purging," U.S. Appl. No. 14/742,535, filed Jun. 17, 2015, 56 pages.
(Continued)

*Primary Examiner* — Sizo Vilakazi
(74) *Attorney, Agent, or Firm* — Julia Voutyras; McCoy Russell LLP

(57) ABSTRACT

Methods and systems are provided for controlling canister purge flow in a boosted engine. An example method for the boosted engine comprises, during boosted conditions, flowing stored fuel vapors from a canister into an ejector coupled in a compressor bypass passage, the flowing bypassing a canister purge valve. The method further comprises, responsive to a canister load higher than a threshold load, closing a canister vent valve coupled to the canister, and discontinuing flowing stored fuel vapors from the canister into the ejector.

20 Claims, 9 Drawing Sheets

(56) References Cited

U.S. PATENT DOCUMENTS

| | | | |
|---|---|---|---|
| 7,316,223 B2 | 1/2008 | Wakahara | |
| 7,950,375 B2 | 5/2011 | Wang et al. | |
| 8,483,934 B2 | 7/2013 | Cunningham et al. | |
| 9,359,923 B2* | 6/2016 | Pursifull | F02B 37/127 |
| 2003/0136386 A1* | 7/2003 | Itakura | F02M 25/06 |
| | | | 123/520 |
| 2015/0204283 A1* | 7/2015 | VanDerWege | F02M 35/10144 |
| | | | 123/445 |
| 2015/0292421 A1* | 10/2015 | Pursifull | F02D 41/004 |
| | | | 123/518 |
| 2016/0201613 A1* | 7/2016 | Ulrey | F02D 41/0007 |
| | | | 123/520 |
| 2016/0201615 A1* | 7/2016 | Pursifull | F02D 41/26 |
| | | | 123/520 |

OTHER PUBLICATIONS

Ulrey, J. et al., "System and Method for Improving Canister Purging," U.S. Appl. No. 14/593,945, filed Jan. 9, 2015, 82 pages.

Pursifull, R. et al., "System and Method for Improving Canister Purging," U.S. Appl. No. 14/593,985, filed Jan. 9, 2015, 83 pages.

* cited by examiner

SYSTEM AND METHOD FOR CONTROLLING CANISTER PURGING

FIELD

The present disclosure relates to systems and methods for controlling purging of fuel vapors stored in a fuel vapor canister of an evaporative emissions system.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system may allow the vapors to be purged into an engine intake manifold for use as fuel. The purging of fuel vapors from the fuel vapor canister may involve opening a canister purge valve coupled to a conduit between the fuel vapor canister and the intake manifold.

In an example approach shown by Bugin et al. in U.S. Pat. No. 5,005,550, a fuel system canister is purged using either vacuum from an engine intake manifold or vacuum generated by an aspirator. The aspirator is coupled in a compressor bypass passage and vacuum is generated by the aspirator (also termed ejector herein) via motive flow through the compressor bypass passage. During a purge operation into the intake manifold, vacuum or negative pressure in the intake manifold may be applied to the fuel system canister via a solenoid valve. Alternatively, when manifold vacuum is insufficient, such as during boosted conditions, aspirator vacuum may draw desorbed fuel vapors along with purge air from the canister into the compressor bypass passage.

The inventors herein have identified potential issues with the above approach. As an example, when the fuel vapor canister is saturated, purge flow from the fuel vapor canister into the aspirator may contain more fuel vapors than desired. For example, during transient conditions such as rapid deceleration, fuel demand from the engine may be significantly lower. However, aspirator vacuum may continue to extract fuel vapors from the fuel vapor canister and may supply these fuel vapors to the engine. Excess fuel than desired can increase combustion instability, and lead to adverse effects such as loss of engine power and efficiency. These issues may be of higher concern when motive flow through the aspirator is not regulated by a valve.

The inventors herein have recognized the above issues and identified an approach to at least partly address the issues. In one example approach, a method for a boosted engine comprises, during boosted conditions, flowing stored fuel vapors from a canister into an ejector coupled in a compressor bypass passage, the flowing bypassing a canister purge valve, and responsive to a canister load higher than a threshold, closing a canister vent valve coupled to the canister, and discontinuing flowing stored fuel vapors from the canister into the ejector. Thus, saturated fuel vapors may not be delivered to the ejector by closing the canister vent valve.

For example, a boosted engine may include an ejector positioned in a compressor bypass passage. A suction port of the ejector may be fluidically coupled to a fuel vapor canister. The fuel vapor canister may be fluidically coupled to atmosphere via a canister vent valve. The fuel vapor canister may also be fluidically coupled to an intake manifold of the boosted engine via a canister purge valve. The fuel vapor canister may communicate with each of the canister purge valve, the atmosphere, and the suction port of the ejector via distinct and separate passages. The ejector may generate vacuum due to the flow of compressed air in the compressor bypass passage. As such, the ejector may be an un-valved ejector such that motive flow of compressed air through the ejector may not be regulated actively. Herein, the un-valved ejector may not include a valve controlled by an engine controller situated at any of the suction port of the ejector, motive inlet of the ejector, or motive outlet of the ejector. Ejector vacuum may draw stored vapors from the fuel vapor canister into an inlet of the compressor. Thus, the fuel vapor canister may be purged during boosted engine conditions. However, when a load of the fuel vapor canister is determined to be higher than a threshold, purging of the fuel vapor canister via the ejector may be discontinued by closing the canister vent valve. Specifically, the canister vent valve may be adjusted to a fully closed position to cease canister purge. Further, the canister vent valve may be closed in response to the load of the fuel vapor canister being higher than the threshold during lower engine air flow conditions such as deceleration.

In this way, vapor purge from a fuel vapor canister into an ejector may be controlled in a simpler manner. The canister vent valve may be used to control purge flow into the ejector in engine systems including un-valved ejectors. By controlling purge flow into the ejector via the canister vent valve, an additional shut-off valve for the ejector may not be utilized, saving costs. Further, since purge flow into the ejector is based on canister load, the engine may not receive rich vapors when fuel demand is lower. Accordingly, engine performance may be enhanced and drivability may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
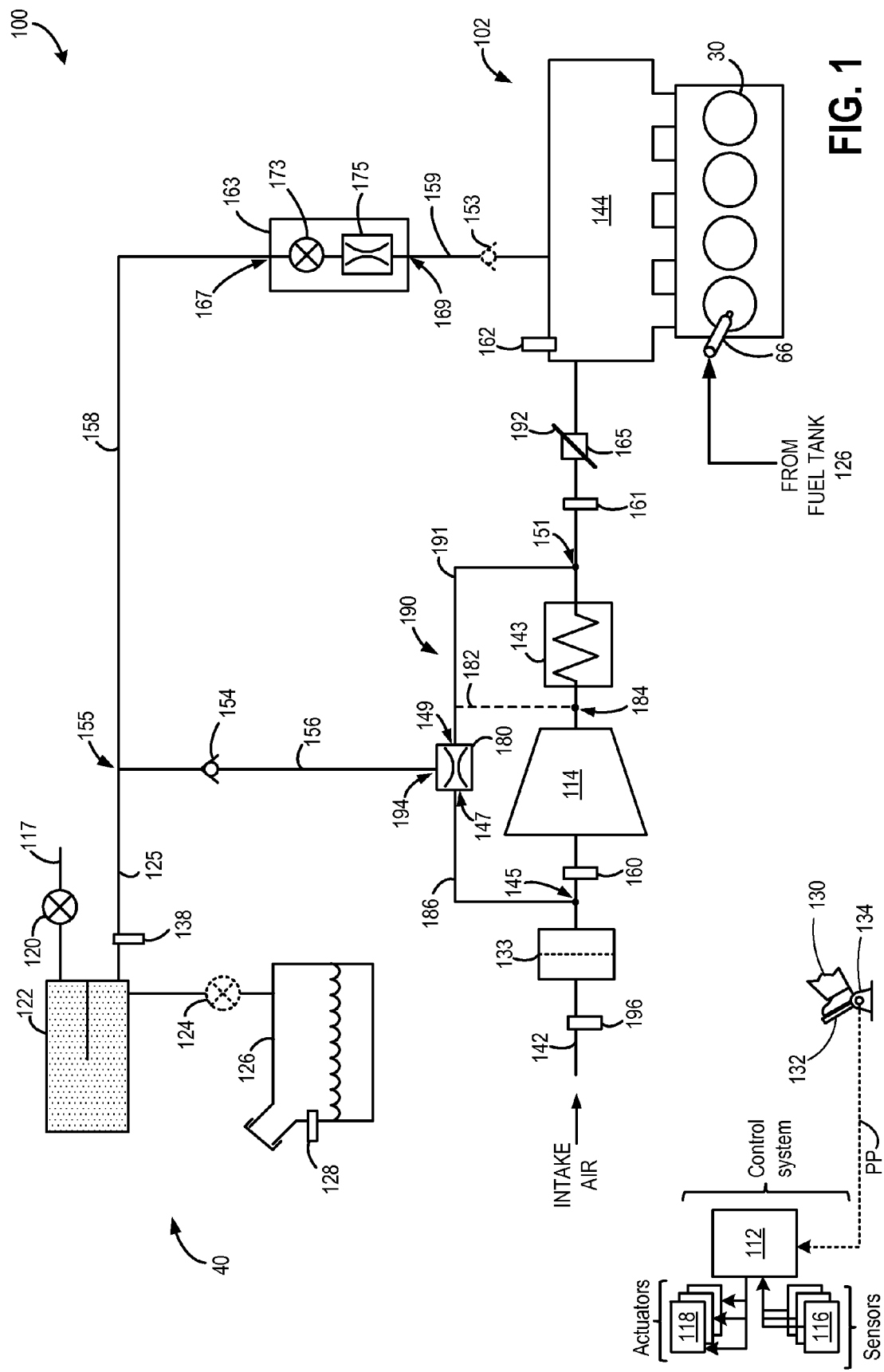
FIG. 1 is a schematic depiction of an example engine system including an ejector coupled to a fuel vapor canister.
Figure 3:
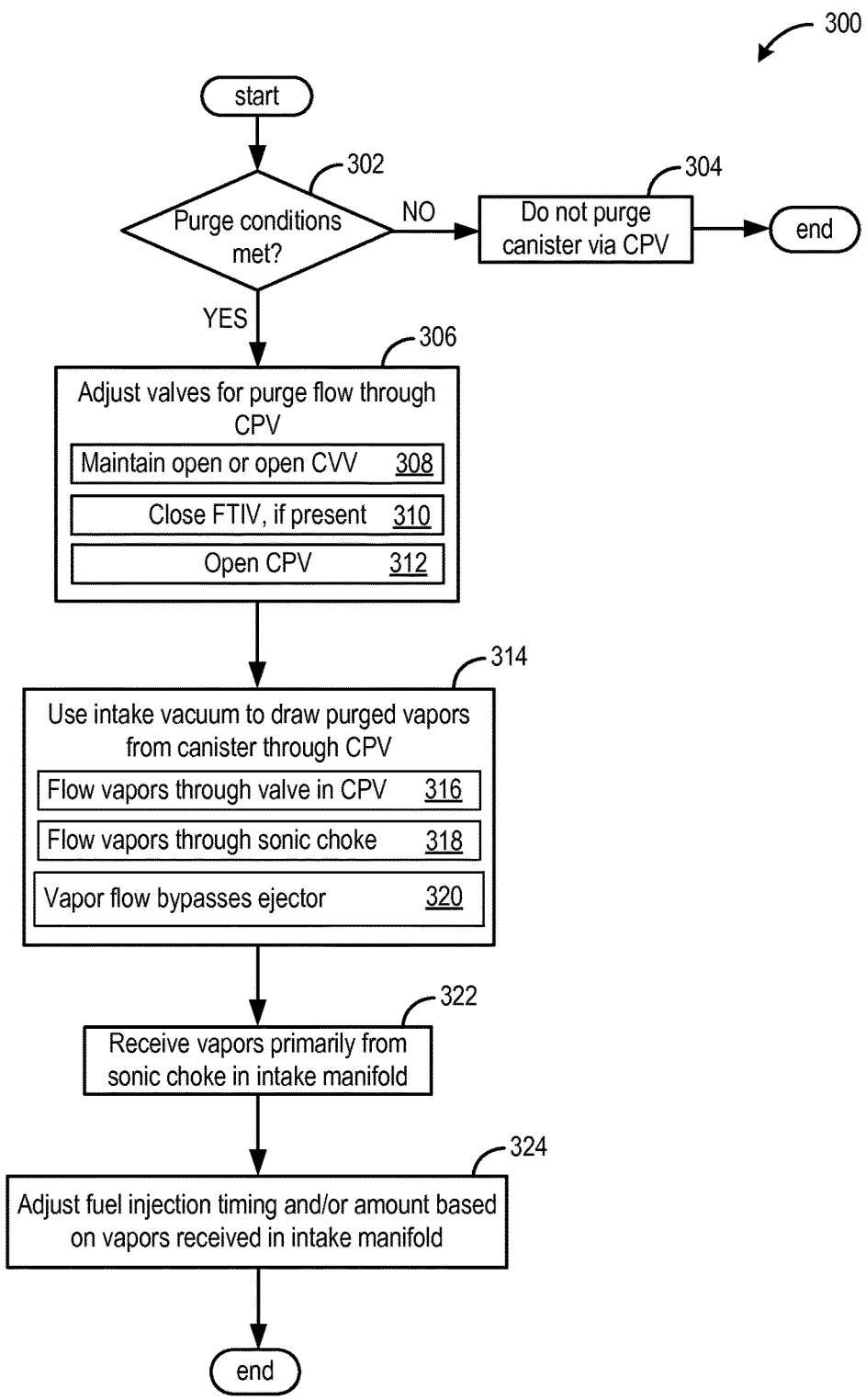
FIG. 3 depicts a high level flowchart illustrating purge flow during non-boosted conditions in the engine system of FIG. 1 through a canister purge valve.
Figure 4:
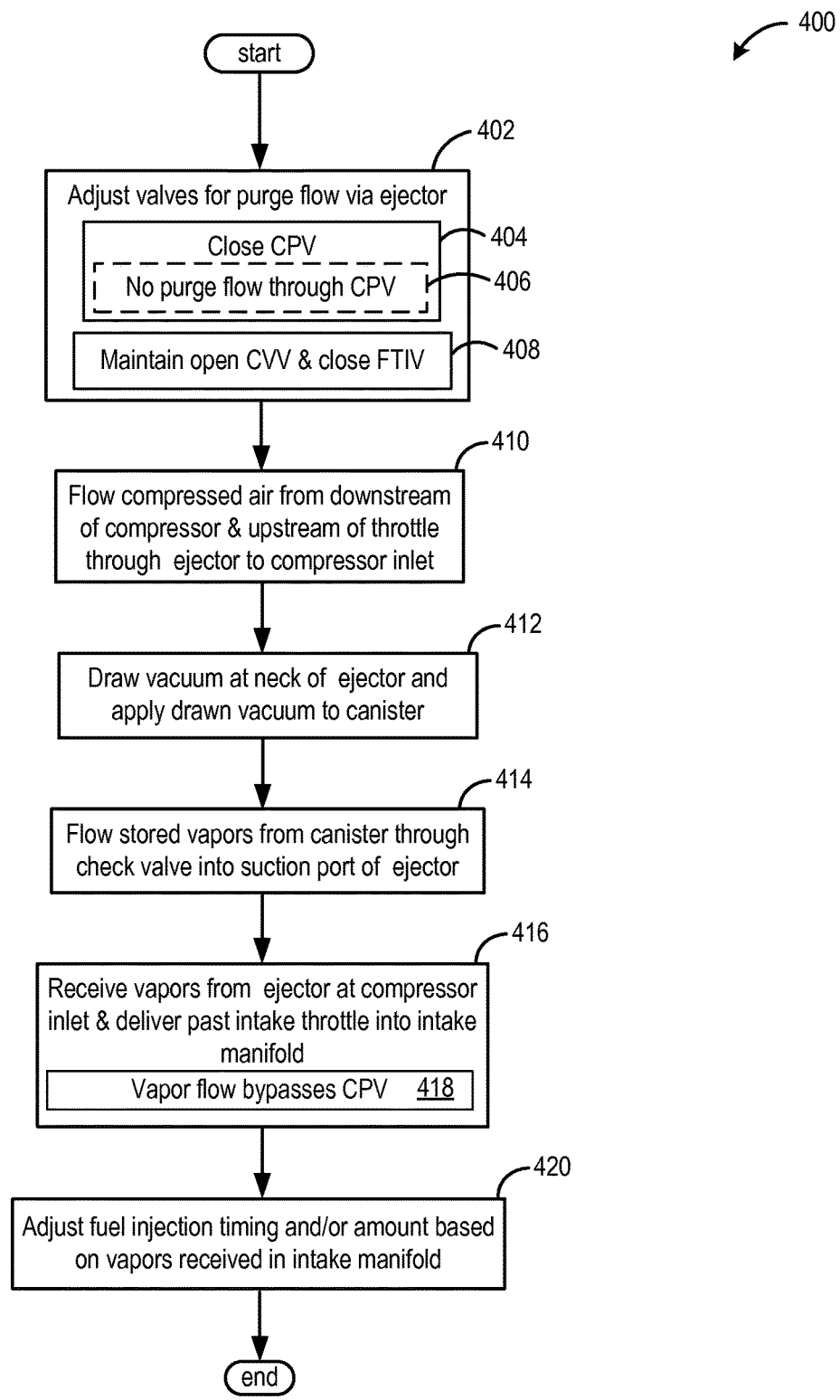
FIG. 4 depicts a high level flowchart for purge flow into the ejector during boosted conditions.
Figure 5:
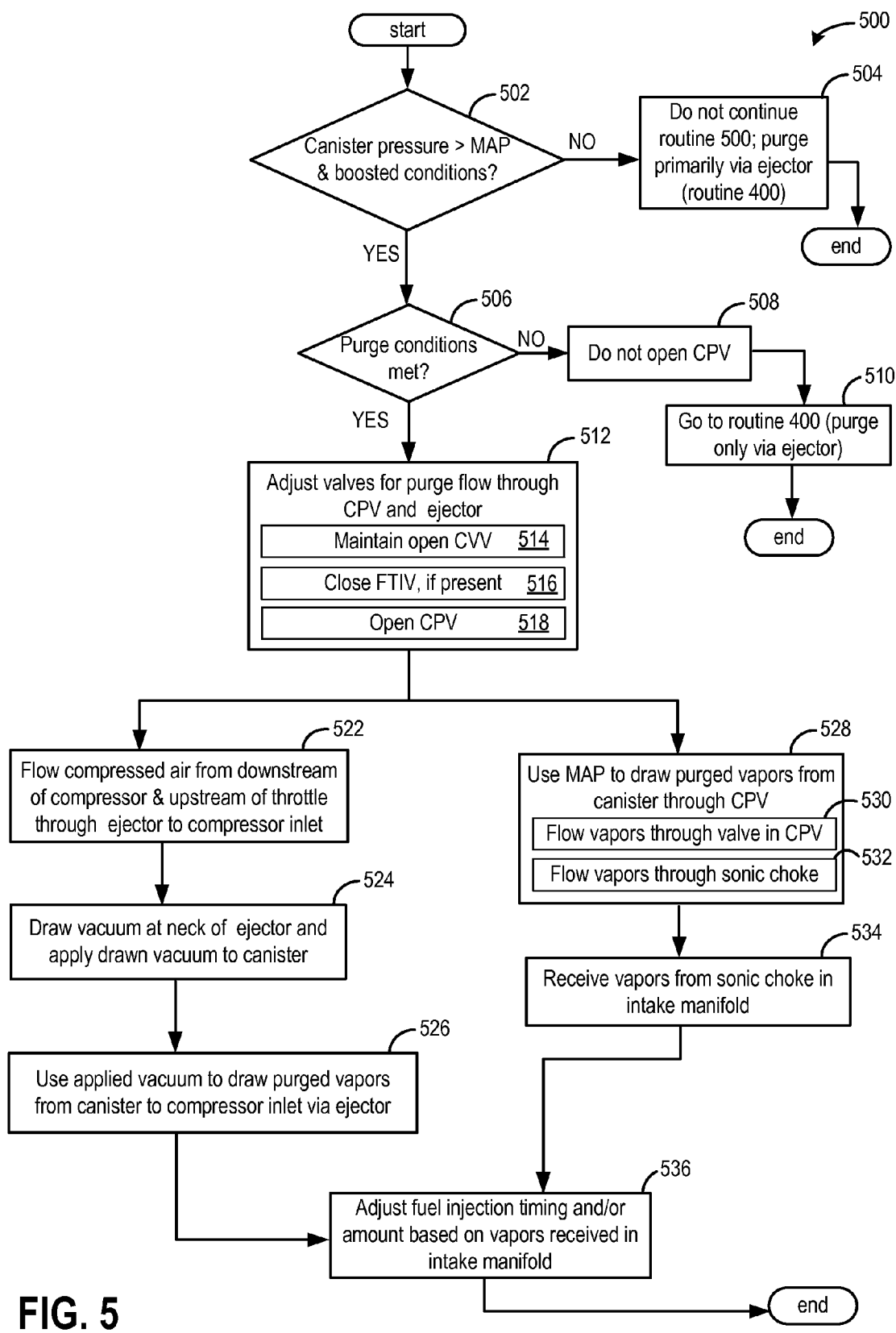
FIG. 5 portrays an example high level flowchart for purge flow during boosted conditions and when a canister pressure is higher than a pressure in an intake manifold in the example engine system of FIG. 1.
Figure 6:
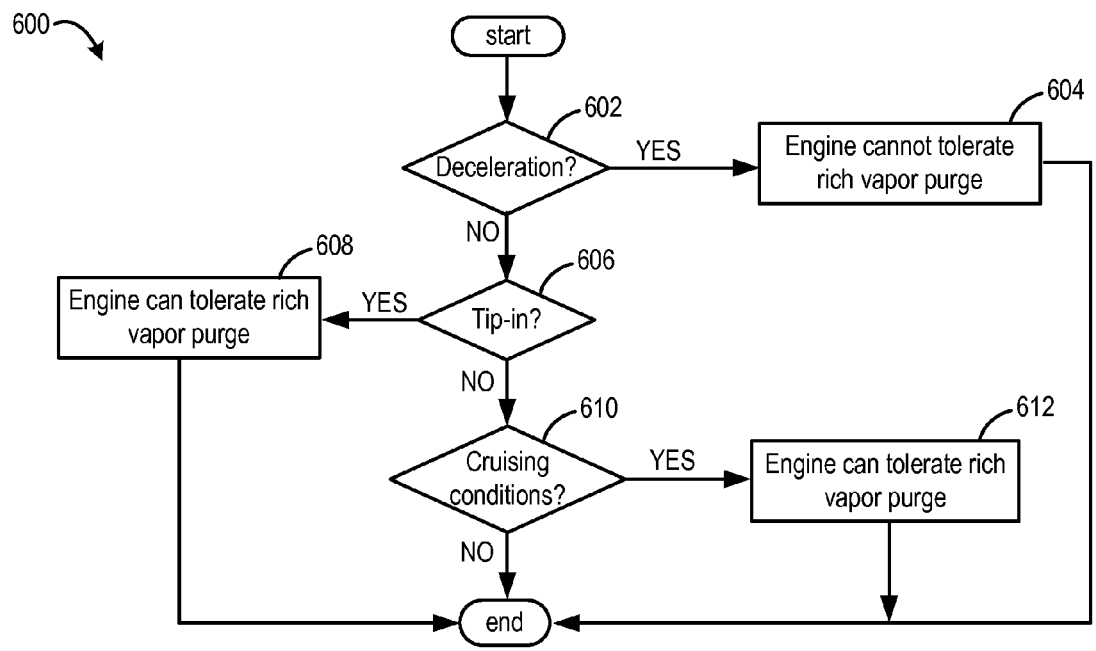
FIG. 6 illustrates a high level flowchart for determining when engine conditions can tolerate a rich vapor purge via the ejector.
Figure 8:
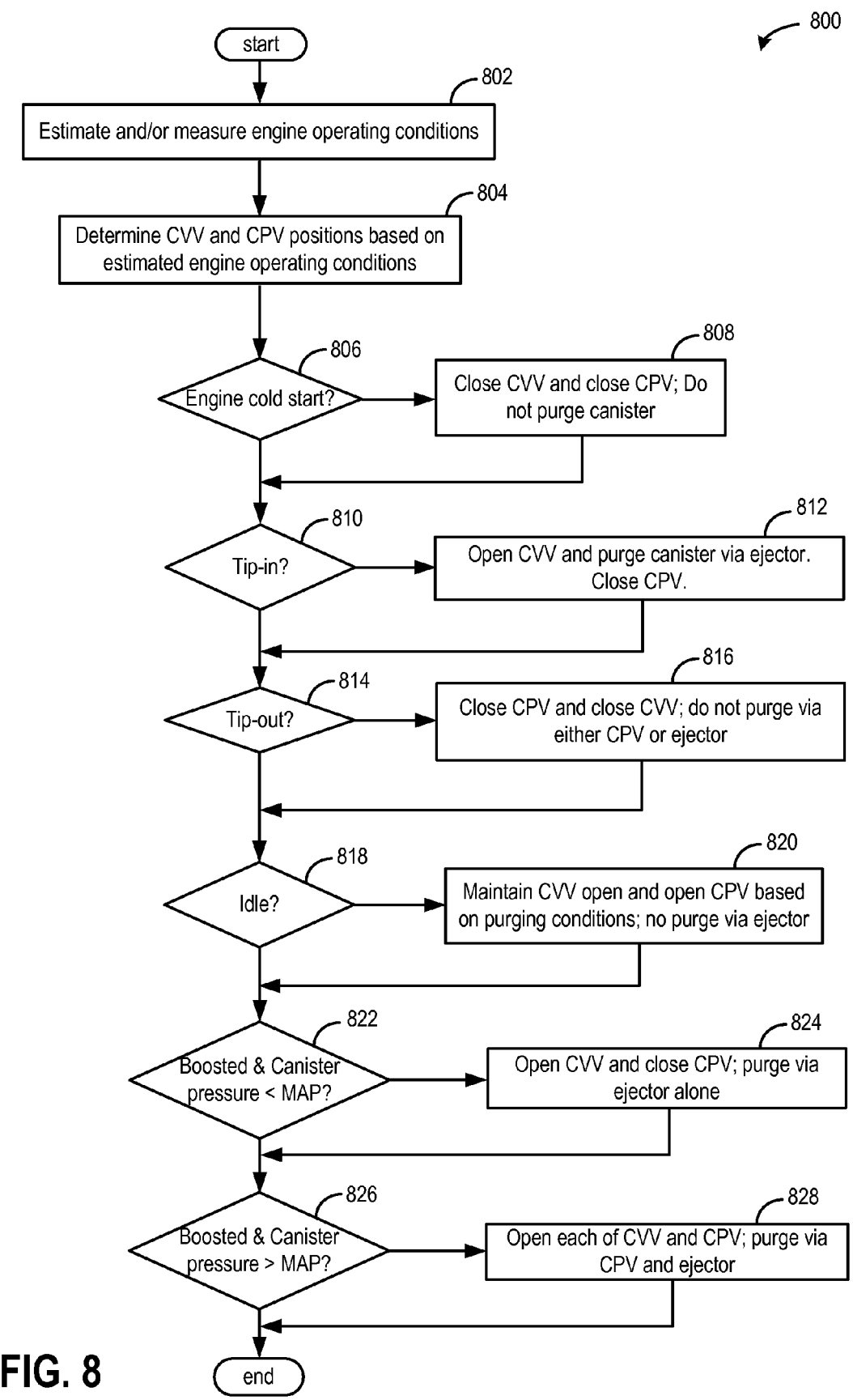
FIG. 8 presents a high level flowchart for controlling a canister vent valve and the canister purge valve in the example engine system of FIG. 1.
Figure 9:
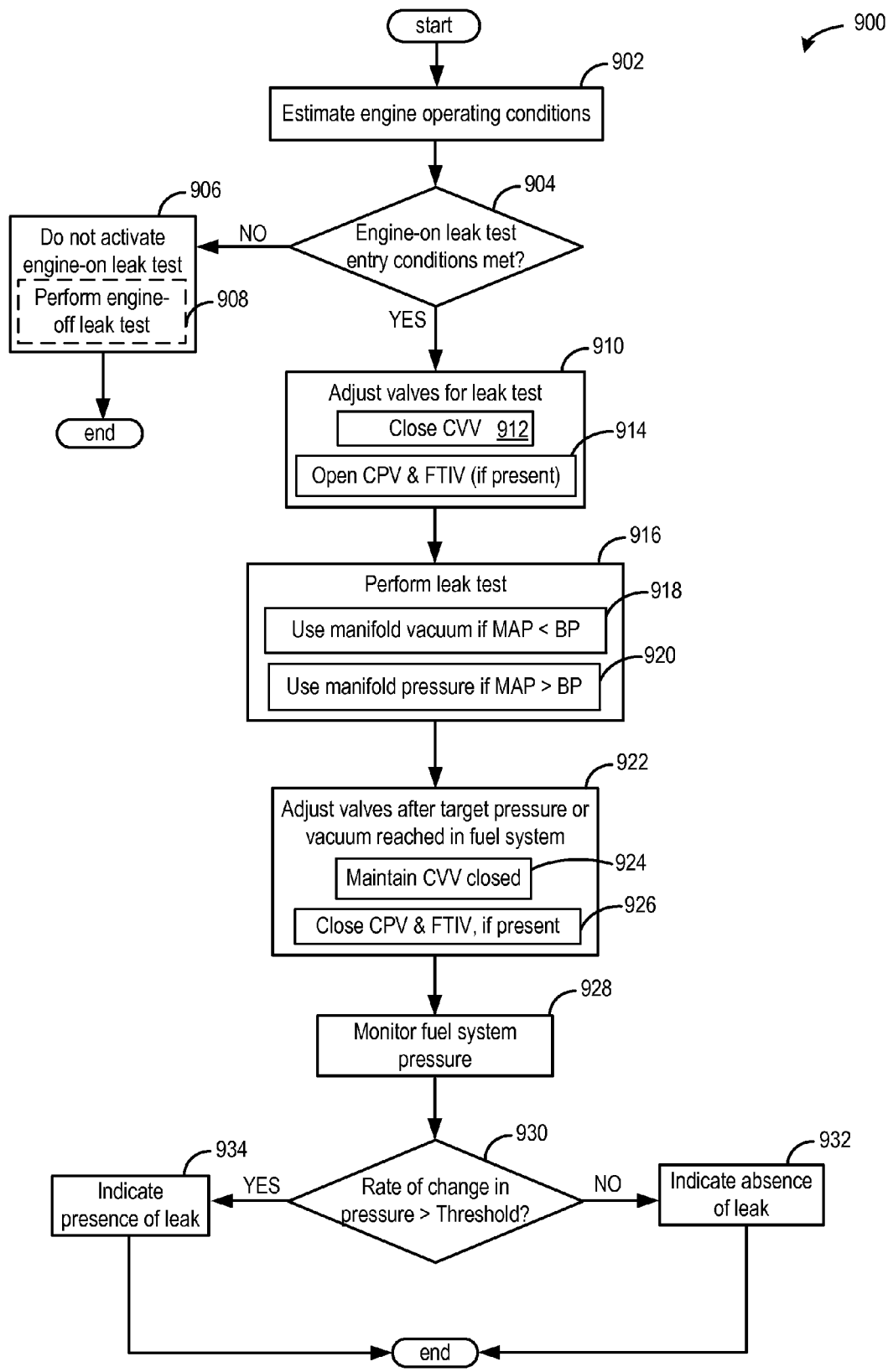
FIG. 9 shows a high level flowchart for diagnosing a leak in a fuel system in the example engine system of FIG. 1.
Figure 10:
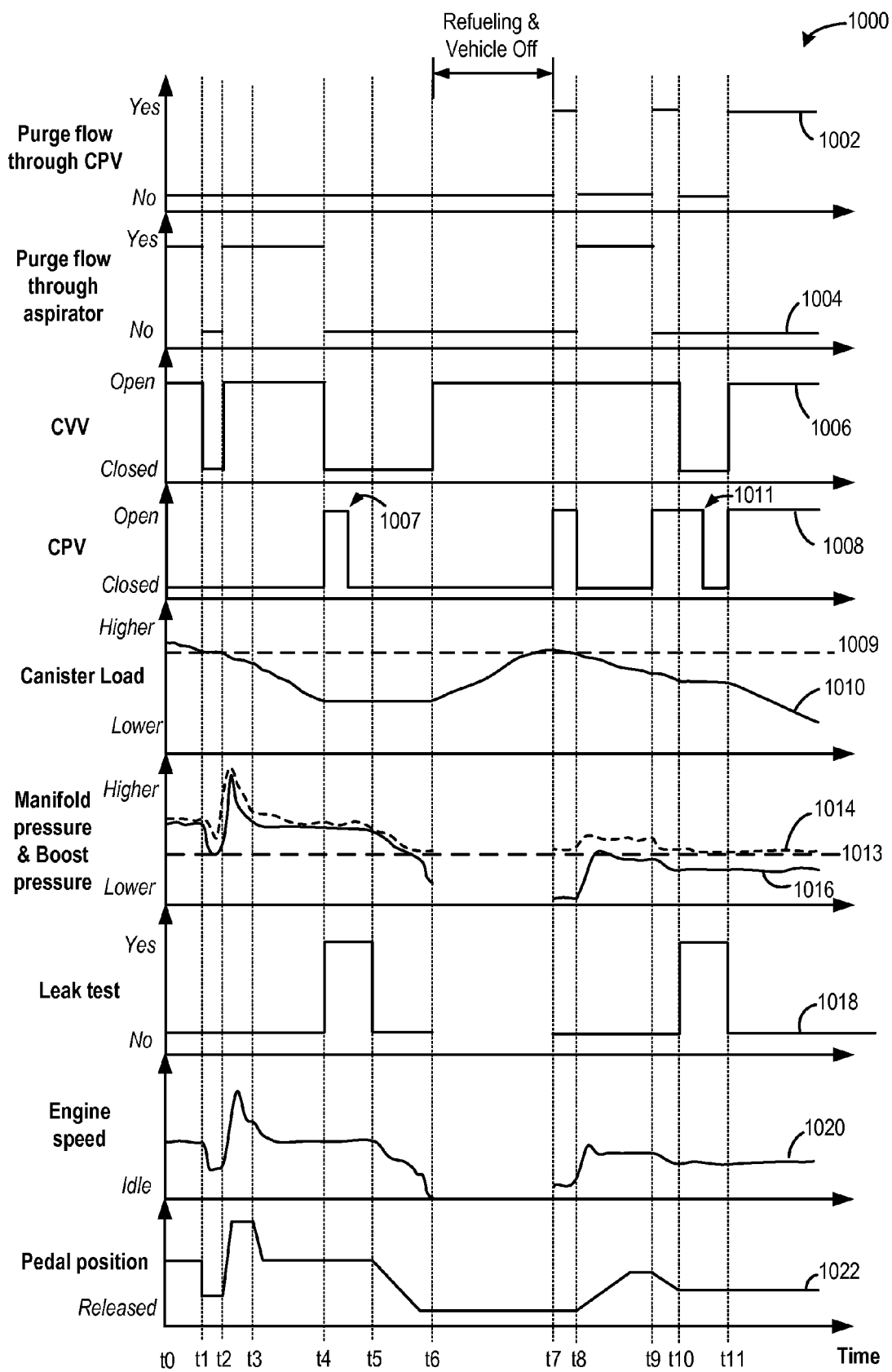
FIG. 10 is an example control of the canister vent valve and canister purge valve in the example engine system of FIG. 1.

The following detailed description relates to systems and methods for controlling purging of a fuel vapor canister included in an engine system, such as the engine system of FIG. 1. The engine system may be a boosted engine including a turbine and a compressor. Further, the engine system may include an ejector coupled within a compressor bypass passage. The compressor bypass passage may divert compressed air from downstream of an intercooler to upstream of the compressor, as shown in FIG. 1. The fuel vapor canister may be coupled to an engine intake manifold via a canister purge valve. The fuel vapor canister may also be coupled to the ejector. Thus, stored fuel vapors in the fuel vapor canister may be purged via two paths into an intake of the engine. During non-boosted conditions, fuel vapors may be purged via the canister purge valve into the intake manifold (FIG. 3). During boosted conditions, fuel vapors from the fuel vapor canister may be purged into the ejector (FIG. 4). Further, when intake manifold pressure is lower than canister pressure during boosted conditions, stored vapors in the fuel vapor canister may be purged into each of the ejector and the intake manifold (FIG. 5). A canister vent valve coupled to the fuel vapor canister may be adjusted to disable purge flow via the aspirator (FIG. 2) when certain engine conditions exist (FIG. 6). A controller of the engine system may include instructions to activate a routine, such as that shown in FIG. 7, when fuel tank refueling is desired. The controller may also determine opening and closing of each of the canister vent valve and the canister purge valve based on various engine conditions (FIG. 8). Further still, the controller may diagnose the fuel vapor canister, and an associated evaporative emissions system and fuel system for leaks (FIG. 9). An example engine operation is depicted in FIG. 10 depicting control of the canister vent valve to regulate canister purging via the ejector.

Referring now to FIG. 1, it shows aspects of an example engine system 100 which may be included in an automotive vehicle. The engine system is configured for combusting fuel vapor accumulated in at least one component thereof. Engine system 100 includes a multi-cylinder internal combustion engine, generally depicted at 102, which may propel the automotive vehicle. Engine 102 may be controlled at least partially by a control system including a controller 112 and by input from a vehicle operator 130 via an input device 132. In this example, input device 132 includes an accelerator pedal and a pedal position sensor 134 for generating a proportional pedal position signal PP.

Engine 102 includes an intake throttle 165 fluidically coupled to an intake manifold 144 along an intake passage 142. Air may enter intake passage 142 from an air intake system (AIS) including an air cleaner 133 in communication with the vehicle's environment. Intake throttle 165 may include throttle plate 192. In this particular example, the position of throttle plate 192 may be varied by controller 112 via a signal provided to an electric motor or actuator included with intake throttle 165, a configuration that is commonly referred to as electronic throttle control (ETC). In this manner, intake throttle 165 may be operated to vary the intake air provided to intake manifold 144 and the plurality of cylinders therein.

A barometric pressure sensor 196 may be coupled at an inlet of intake passage 142 for providing a signal regarding barometric pressure (BP). A manifold air pressure sensor 162 may be coupled to intake manifold 144 for providing a signal regarding manifold air pressure (MAP) to controller 112. A throttle inlet pressure sensor 161 may be coupled immediately upstream of intake throttle 165 for providing a signal regarding throttle inlet pressure (TIP) or boost pressure.

Intake manifold 144 is configured to supply intake air or an air-fuel mixture to a plurality of combustion chambers 30 (also termed, cylinders 30) of engine 102. The combustion chambers 30 may be arranged above a lubricant-filled crankcase (not shown), in which reciprocating pistons of the combustion chambers rotate a crankshaft (not shown). Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Further, exhaust gases from combustion chambers 30 may exit engine 102 via an exhaust manifold (not shown) into an emission control device (not shown) coupled to an exhaust passage (not shown).

Engine system 100 may further include a compressor 114 for providing a boosted intake air charge to intake manifold 144. In the example of a turbocharger compressor, compressor 114 may be mechanically coupled to and driven by an exhaust turbine (not shown) powered by exhaust gases flowing from the engine. The exhaust turbine may be positioned in the exhaust passage and may be driven by exhaust gases. A wastegate (not shown) may be coupled across the exhaust turbine of the turbocharger. Specifically, the wastegate may be included in a bypass passage coupled between an inlet and outlet of the exhaust turbine. By adjusting a position of the wastegate, an amount of boost provided by the exhaust turbine may be controlled.

Alternatively, compressor 114 may be any suitable intake-air compressor, such as a motor-driven supercharger compressor.

In the configuration illustrated in FIG. 1, compressor 114 draws fresh air from air cleaner 133 and flows compressed air through intercooler 143. The intercooler may also be termed a charge air cooler. As such, each of compressor 114 and intercooler 143 are positioned upstream of intake throttle 165. The intercooler 143 cools the compressed air, which then flows via intake throttle 165 to intake manifold 144, depending on the position of throttle plate 192 of intake throttle 165. A compressor inlet pressure sensor 160 is coupled immediately upstream of the compressor 114 for providing a signal regarding compressor inlet pressure (CIP) to controller 112.

A bypass passage 190 (also termed compressor bypass passage) may be coupled across compressor 114 to divert a portion of intake air compressed by compressor 114 back upstream of the compressor into the compressor inlet. The bypass passage 190 may be formed by first passage 186 and second passage 191, and also includes an aspirator 180, positioned as shown in FIG. 1. Aspirators (which may alternatively be referred to as ejectors, venturi pumps, jet pumps, and eductors) are passive devices which provide low-cost vacuum generation when utilized in engine systems. As such, aspirator 180 may be an ejector, an eductor, a venturi, a jet pump, or similar passive device.

As depicted in the example of FIG. 1, a first end 145 of first passage 186 may be coupled to intake passage 142 downstream of air cleaner 133 and upstream of compressor 114. A second end 147 of first passage 186 may be coupled with second passage 191 via aspirator 180. As such, second end 147 of first passage 186 may be coupled to a motive outlet of aspirator 180. In other words, the motive outlet of aspirator 180 may be fluidically coupled to intake passage 142 upstream of compressor 114 and upstream of CIP sensor 160 via first passage 186. Therefore, motive flow of compressed air from downstream of the compressor 114 mixed with other fluids that may be drawn into the aspirator via suction may be streamed into intake passage 142 at a location upstream of the compressor and downstream of air cleaner 133 (e.g., at first end 145).

Further, a first end 151 of second passage 191 may fluidically communicate with intake passage 142 downstream of compressor 114, downstream of intercooler 143, and upstream of intake throttle 165. A second end 149 of second passage 191 may be coupled to a motive inlet of aspirator 180 and therethrough to first passage 186. Thus, the motive inlet of aspirator 180 may fluidically communicate with intake passage 142 at a point that is downstream of compressor 114, downstream of intercooler 143, and upstream of intake throttle 165.

The depicted embodiment may not include any intervening elements or components located in the bypass passage 190 other than the depicted elements, e.g., aspirator 180. Further, there may be no additional components intervening between the motive inlet of the aspirator and first end 151 of second passage 191. Similarly, no further components may be included between the motive outlet of aspirator 180 and the first end 145 of first passage 186.

In an alternative embodiment, as shown by the dashed line, the motive inlet of aspirator 180 may be fluidically coupled to the intake passage 142 downstream of compressor 114 but upstream of intercooler 143. Specifically, motive inlet of ejector 180 may be fluidically coupled via passage 182 (dashed lines) to intake passage 142 at node 184, node 184 located downstream of compressor 114 and upstream of intercooler 143. In the alternative embodiment, compressed air from upstream of the intercooler may be diverted through the compressor bypass passage.

An amount of air diverted through the bypass passage 190 formed by first passage 186 and second passage 191 may depend upon relative pressures within the engine system. Thus, motive flow through aspirator 180 may not be actively regulated. Further, when air is diverted through bypass passage 190, vacuum may be generated at ejector 180 for a variety of purposes including drawing fuel vapors from a canister, applying vacuum to a vacuum consumption device such as a brake booster, or for storage in a vacuum reservoir.

Engine system 100 further includes fuel system 40 comprising fuel tank 126, fuel vapor canister 122, and other components which will be described further below. Fuel tank 126 stores a volatile liquid fuel that may be delivered via fuel injector 66 to combustion chambers 30 in engine 102. To avoid emission of fuel vapors from the fuel tank 126 into the atmosphere, the fuel tank 126 is vented to the atmosphere through fuel vapor canister 122. Fuel vapor canister may also be referred to as an adsorbent canister, a fuel system canister, a charcoal canister, or simply, a canister, in the rest of this description. The fuel vapor canister may be part of an evaporative emissions system. Fuel vapor canister 122 may have a significant capacity for storing hydrocarbon-, alcohol-, and/or ester-based fuels in an adsorbed state. The adsorbent canister may be filled with activated carbon granules and/or another high surface-area material, for example, to adsorb fuel vapors received from the fuel tank. Nevertheless, prolonged adsorption of fuel vapor will eventually reduce the capacity of the adsorbent canister for further storage and may result in bleed emissions. Therefore, the adsorbent canister may be periodically purged of adsorbed fuel vapors, as further described hereinafter. While a single fuel vapor canister 122 is shown in FIG. 1, it will be appreciated that any number of canisters may be coupled in engine system 100.

A vapor blocking valve (VBV) 124 (also termed, fuel tank isolation valve 124) may be optionally included in a conduit between fuel tank 126 and fuel vapor canister 122. In some embodiments, VBV 124 may be a solenoid valve, and operation of VBV 124 may be regulated by adjusting a driving signal (or pulse width) of the dedicated solenoid. VBV 124 may be a normally open valve. By maintaining the VBV at open, the vehicle can be refueled when the engine is shut down. Specifically, refueling vapors from fuel tank 126 may flow through VBV 124 into fuel vapor canister 122 for adsorption. Further, remnant air may exit into the atmosphere through canister vent valve 120 along vent line 117. It will be noted that VBV 124 may be closed during vehicle operation to insure that during purging operation the canister is purged without drawing additional vapors from the fuel tank into the purging operation. Further still, the VBV 124 may be closed to impede flow of vapors generated during fuel slosh in the fuel tank 126 into purge conduit 125. If the VBV were open, these vapors may flow into purge conduit 125 and cause a higher vapor concentration in purge conduit 125. During refueling operations, and selected purging conditions, VBV 124 may be opened to direct fuel vapors from the fuel tank 126 to canister 122. By opening the fuel tank isolation valve (FTIV) 124 during conditions when the fuel tank pressure is higher than a threshold pressure (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the FTIV may be mounted on fuel tank 126.

One or more pressure sensors 128 may be coupled to fuel tank 126 for estimating a fuel tank pressure or vacuum level in fuel tank 126. While the depicted example shows a pressure sensor coupled to fuel tank 126, in alternate embodiments, pressure sensor 128 may be coupled between the fuel tank and VBV 124.

Fuel vapor canister 122 (also termed fuel system canister 122) may be coupled to atmosphere via vent line 117. Further, a canister vent valve 120 (CVV 120) is positioned in vent line 117 to regulate the flow of fresh air into the canister and/or to allow air to exit the canister. For example, during a purging operation, fresh air is drawn through CVV 120 into fuel vapor canister 122 to enable desorption of stored fuel vapors. In another example, such as during a refueling operation, a mixture of air and fuel vapors may flow from fuel tank 126 into fuel system canister 122 via optional FTIV 124. The fuel vapors may be adsorbed within fuel vapor canister 122 while air, stripped of fuel vapors, exits the canister via CVV 120.

The depicted example of engine system 100 shows fuel vapor canister 122 additionally coupled to each of a canister purge valve 163 (CPV 163) and a suction port 194 of aspirator 180. Specifically, fuel vapor canister 122 (also termed, canister 122) is fluidically coupled to CPV 163 via purge conduit 125 and first conduit 158, while fuel vapor canister also communicates fluidically with suction port 194 of ejector 180 via purge conduit 125 and second conduit 156. Purge conduit 125 may split into first conduit 158 and second conduit 156 at node 155. In other words, first conduit 158 and second conduit 156 merge at node 155. Second conduit 156 includes check valve 154 to allow fuel vapor flow from fuel vapor canister 122 towards aspirator 180. Further, check valve 154 obstructs flow of air from aspirator 180 towards fuel vapor canister 122. Further still, check valve 154 allows the fuel vapor canister (and associated plumbing elements) to be checked for leaks at a vacuum.

Thus, fuel vapors stored in canister 122 may be released into engine 102 via CPV 163 and/or ejector 180. Fuel vapors released from canister 122 during a purging operation may be directed into intake manifold 144 via purge conduit 125, first conduit 158, and through CPV 163. The flow of vapors along first conduit 158 may be regulated by CPV 163, coupled between the fuel system canister and the engine intake. Further, CPV 163 may be fluidically coupled to intake manifold 144 via purge path 159. The quantity and rate of vapors released by the canister purge valve may be determined by the duty cycle of an associated canister purge valve solenoid (not depicted). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional check valve 153 (shown in dotted form) may be included in purge path 159 to prevent intake manifold pressure from flowing gases in the opposite direction of the purge flow. As such, the optional check valve may be included if the canister purge valve control is not accurately timed or the canister purge valve itself can be forced open by a high intake manifold pressure.

Fuel vapors stored in canister 122 may be released into ejector 180 based on vacuum generated by ejector 180. Specifically, fuel vapors may flow from fuel vapor canister 122 through purge conduit 125, across node 155 into second conduit 156, and through check valve 154 into suction port 194 of aspirator 180. As long as compressed air flows through the ejector as motive flow, vacuum may be generated by the ejector and stored vapors in the canister may be drawn into the suction port of the ejector.

It will be appreciated that fuel vapor canister 122 is fluidically coupled to each of ejector 180, CPV 163, fuel tank 126, and the atmosphere via distinct and separate conduits.

CVV 120 may be a separate valve and may not be in direct contact with canister 122. Further, CVV 120 may be a solenoid valve, and operation of CVV 120 may be regulated by adjusting a driving signal (or pulse width) of the dedicated solenoid. CVV 120 may be controlled by controller 112 based on purging conditions, refueling conditions, and others. CVV 120 may be either a binary valve (e.g., a two-way valve, also termed a two position valve, and an open/closed valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. It will be noted that CVV 120 may be largely maintained open (e.g., fully open) and may be adjusted closed based on operating conditions.

CPV 163, which is depicted schematically in FIG. 1, comprises a solenoid valve 173 and a flow restriction 175. In the depicted example, flow restriction 175 may be a sonic choke 175. It will be noted that the solenoid valve 173 and the sonic choke 175 may be positioned within a single, common housing of CPV 163. In other words, solenoid valve 173 and sonic choke 175 may be located within the same housing of the CPV 163. It will also be noted that sonic choke 175 is positioned proximate to solenoid valve 173 within CPV 163. It may be further noted that the CPV may include valves other than solenoid valves and flow restrictions other than sonic chokes without departing from the scope of the present disclosure. Sonic choke 175 may also be termed sonic nozzle 175. As such, sonic choke 175 and solenoid valve 173 may be arranged in series.

As depicted in FIG. 1, flow restriction 175 (or sonic choke 175) is positioned downstream of solenoid valve 173 such that an inlet of sonic choke 175 fluidically communicates with an outlet of solenoid valve 173. In alternate embodiments, sonic choke 175 may be positioned upstream of solenoid valve 173 without departing from the scope of this disclosure. An outlet of sonic choke 175 is fluidically coupled to intake manifold 144 via purge path 159. As shown, purge path 159 fluidically couples the outlet of sonic choke 175 to intake manifold 144 downstream of intake throttle 165.

A sonic choke is a special kind of flow restriction that results in a substantially fixed flow rate for a vacuum deeper than 15-20 kPa. The sonic choke has an ability of pressure recovery that makes it different from an orifice without pressure recovery. Without pressure recovery, choked flow may occur at vacuum deeper that 52 kPa, assuming an upstream pressure is 100 kPa.

Opening or closing of CPV 163 is performed via actuation of solenoid valve 173 by controller 112. Specifically, a pulse width modulated (PWM) signal may be communicated to the solenoid valve 173 in CPV 163 during a canister purging operation. In one example, the PWM signal may be at a frequency of 10 Hz. In another example, the solenoid valve 173 may receive a PWM signal at a multiple or sub-multiple of engine firing frequency which may provide the solenoid valve with a similar actuation characteristic to a fuel injector.

CPV 163 may be a two-port CPV comprising a first, inlet port 167 in fluidic communication with fuel vapor canister 122 and a second, outlet port 169 fluidically coupling an outlet of sonic choke 175 to intake manifold 144 via purge path 159. To elaborate, first inlet port 167 of CPV 163 is fluidically coupled to fuel vapor canister 122 via first conduit 158 and purge conduit 125. CPV 163 may be a different type of valve, than that described herein, without departing from the scope of this disclosure.

As mentioned earlier, fuel vapor canister 122 fluidically communicates with each of CPV 163 and aspirator 180 via separate and distinct passages e.g. first conduit 158 and second conduit 156, respectively.

It will also be noted that second conduit 156 circumvents CPV 163. Thus, purge flow from fuel vapor canister 122 to the entraining inlet 194 of aspirator 180 may not be restricted by solenoid valve 173 of CPV 163. Put another way, fuel vapors flowing from canister 122, through purge conduit 125, past check valve 154, along second conduit 156 into suction port 194 of aspirator 180 may not be impeded by a solenoid valve (such as solenoid valve 173) or by a sonic choke (such as sonic choke 175) included in the canister purge valve 163. Thus, purge flow entering entraining inlet 194 of ejector 180 may not be regulated by a valve in the above described path.

Second conduit 156 is coupled to purge conduit 125 at node 155 positioned upstream of CPV 163 and downstream of fuel vapor canister 122. Specifically, second conduit 156 is fluidically coupled with purge conduit 125 upstream of inlet port 167 of CPV 163. Accordingly, stored fuel vapors from fuel vapor canister 122 may be drawn towards aspirator 180 when a vacuum is generated at the aspirator 180, e.g. during boost conditions. In other words, the fuel vapor canister may be purged whenever there is motive flow through the ejector 180.

Furthermore, without a flow restriction such as sonic choke 175 of CPV 163 in the second conduit 156, purge flow along second conduit 156 may continue as long as vacuum is generated at ejector 180, stored vapors are present in the canister, and as long as the pressure at the aspirator neck is lower than canister pressure (or atmospheric pressure).

However, when fuel vapor canister 122 is saturated, an ensuing purging operation may produce a rich purge. For example, if the fuel vapor canister is considerably full, the purged gases may comprise significantly higher fuel vapor concentration with nominal quantities of air. This rich purge may affect engine operation during certain conditions. For example, when engine fuel demand is significantly lower, such as during deceleration conditions, ejector vacuum generated initially during the deceleration may draw purge flow from the canister into the compressor inlet. This purge flow may comprise richer vapors than desired by the engine. Thus, purging the canister into the ejector suction port may not always be desired.

As such, purge flow may be a mixture of fuel vapor and air. Thus, purge flow rate may be a combination of a fuel vapor flow rate and an air flow rate (even when mixed). When the fuel vapor concentration is higher (and with lower concentration of air), the net fuel vapor flow rate may be higher than can be controlled by a fuel control algorithm included in the memory of controller 112. Thus, in order to enable control of fuel into the engine, fuel vapor flow from the canister may be regulated (e.g., limited) to satisfy a desired (e.g., a maximum) fuel vapor flow rate criterion. Accordingly, the CVV 120 may be adjusted by the controller 112 to vary purge flow into the ejector, as will be described further below.

Fuel system 40 may be operated by controller 112 in a plurality of modes by selective adjustment of the various valves and solenoids. For example, the fuel system may be operated in a fuel vapor storage mode wherein the controller 112 may close CPV 163 and open canister vent valve 120 and FTIV 124 to direct refueling and diurnal vapors into canister 122 while preventing fuel vapors from being directed into the intake manifold. In this mode, air stripped of fuel vapors may be streamed from canister 122 to the atmosphere through canister vent valve 120 and vent line 117.

As another example, the fuel system may be operated in a refueling mode (e.g., when fuel tank refueling is requested by a vehicle operator), wherein the controller 112 may open each of CVV 120 and FTIV 124 (or VBV 124), if present, while maintaining canister purge valve 163 closed, to depressurize the fuel tank before enabling fuel to be added therein. As such, FTIV 124 may be kept open during the refueling operation to allow refueling vapors to be stored in the canister. After refueling is completed, the FTIV may be closed.

As yet another example, the fuel system may be operated in a canister purging mode (e.g., when canister is saturated, an emission control device has attained light-off temperature, and with the engine running), wherein the controller 112 may open CPV 163, CVV 120, and close FTIV 124. By closing the FTIV, the canister can be purged more efficiently. During this mode, vacuum generated either by the intake manifold or by the aspirator may be used to draw fresh air through vent line 117 and through fuel system canister 122 to purge the stored fuel vapors into intake manifold 144. In this mode, the purged fuel vapors from the canister, along with air drawn from the atmosphere to enable purging, are combusted in the engine.

The purging may be continued until the stored fuel vapors amount in the canister is below a threshold. In another example, purging may continue until engine conditions cannot tolerate additional fuel vapors and/or air. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister.

Alternatively, in one example, one or more sensors 138 may be coupled to purge conduit 125 to estimate fuel vapor concentration in purge flow. In another example, the fuel system canister load may be based on the number and duration of refueling events that have occurred following a previous canister purging event. Based on the canister load, and further based on engine operating conditions, such as engine speed-load conditions, a purge flow rate may be determined. As such, controller 112 may maintain an estimate of fuel vapor concentration in canister 122 during operation.

During canister purging, vapors stored in fuel vapor canister 122 may be purged to intake manifold 144 by opening solenoid valve 173 of CPV 163. Additionally or alternatively, during boosted conditions when ejector 180 is generating a vacuum, stored fuel vapors may be purged into the suction port 194 (also termed, entraining inlet 194) of the ejector 180. Herein, the fuel vapors merge with compressed air flowing through the ejector and are streamed into the compressor inlet via first end 145 of first passage 186 of the bypass passage. Further, these purged fuel vapors received at the compressor inlet may flow into the intake manifold 144 along with fresh air drawn into the intake.

Motive flow through ejector 180 generates a suction flow at the entraining inlet 194 of ejector 180, thereby generating vacuum which may be used to draw purged fuel vapors via each of purge conduit 125 and second conduit 156. Suction port 194 may be located at a neck of aspirator 180, and therefore, vacuum may be drawn at the neck of the aspirator 180. As such, ejector 180 is a three-port device, coupled to the compressor bypass passage 190, including a motive inlet port, a mixed flow outlet or motive outlet port, and an entraining inlet port. As mentioned earlier, suction port 194 of aspirator 180 fluidically communicates with fuel vapor canister 122 via purge conduit 125 and second conduit 156. Motive inlet of aspirator 180 may be fluidically coupled to second end 149 of second passage 191, and may receive compressed air from downstream of compressor 114. As such, motive inlet of aspirator 180 may be fluidically coupled to intake passage 142 at a location downstream of compressor 114, and in some embodiments, may also be coupled downstream of intercooler 143. Motive outlet of aspirator 180 may be fluidically coupled to second end 147 of first passage 186. Further, motive outlet of ejector 180 may fluidically communicate with intake passage 142 via first passage 186 at a location upstream of compressor 114 via first end 145 of first passage 186. During conditions when motive flow passes through ejector 180, a mixture of the fluid flow from the motive inlet and the entraining inlet 194, referred to herein as mixed flow, exits the mixed flow outlet. In one example, mixed flow exiting the mixed flow outlet may be a combination of air and purged fuel vapors.

It will also be appreciated that vacuum generated by aspirator 180 may be used for additional purposes other than drawing purge flow, without departing from the scope of this disclosure. For example, aspirator generated vacuum may be stored in a vacuum reservoir. In another example, vacuum from the ejector may be used in a brake booster. In yet another example, ejector vacuum may draw crankcase ventilation gases into the intake manifold.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 102 such as BP sensor 196, MAP sensor 162, CIP sensor 160, TIP sensor 161, etc. Furthermore, controller 112 may monitor and adjust the position of various actuators 118 based on input received from the various sensors 116. These actuators may include, for example, intake throttle 165, intake and exhaust valve systems, solenoid valve 173 of CPV 163, canister vent valve 120, and FTIV 124.

Controller 112 may also be configured to intermittently perform leak detection routines on fuel system 40 to confirm that the fuel system is not degraded. As such, leak detection routines may be performed while the engine is off (engine-off leak test) or while the engine is running (as shown at FIG. 9). Leak tests performed while the engine is running may include applying a positive pressure on the fuel system for a duration (e.g., until a target fuel tank pressure is reached) and then sealing the fuel system while monitoring a change in fuel tank pressure (e.g., a rate of change in the pressure, or a final pressure value). Leak tests performed while the engine is running may also include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

Storage medium read-only memory in controller 112 can be programmed with computer readable data representing instructions executable by a processor for performing the routines described below, as well as other variants that are anticipated but not specifically listed. Example routines are described herein with reference to FIGS. 2, 3, 4, 5, 6, 7, 8, and 9.

The controller 112 receives signals from the various sensors of FIG. 1 and employs the various actuators of FIG. 1 to adjust engine operation based on the received signals and instructions stored on a memory of the controller.

Figure 2:
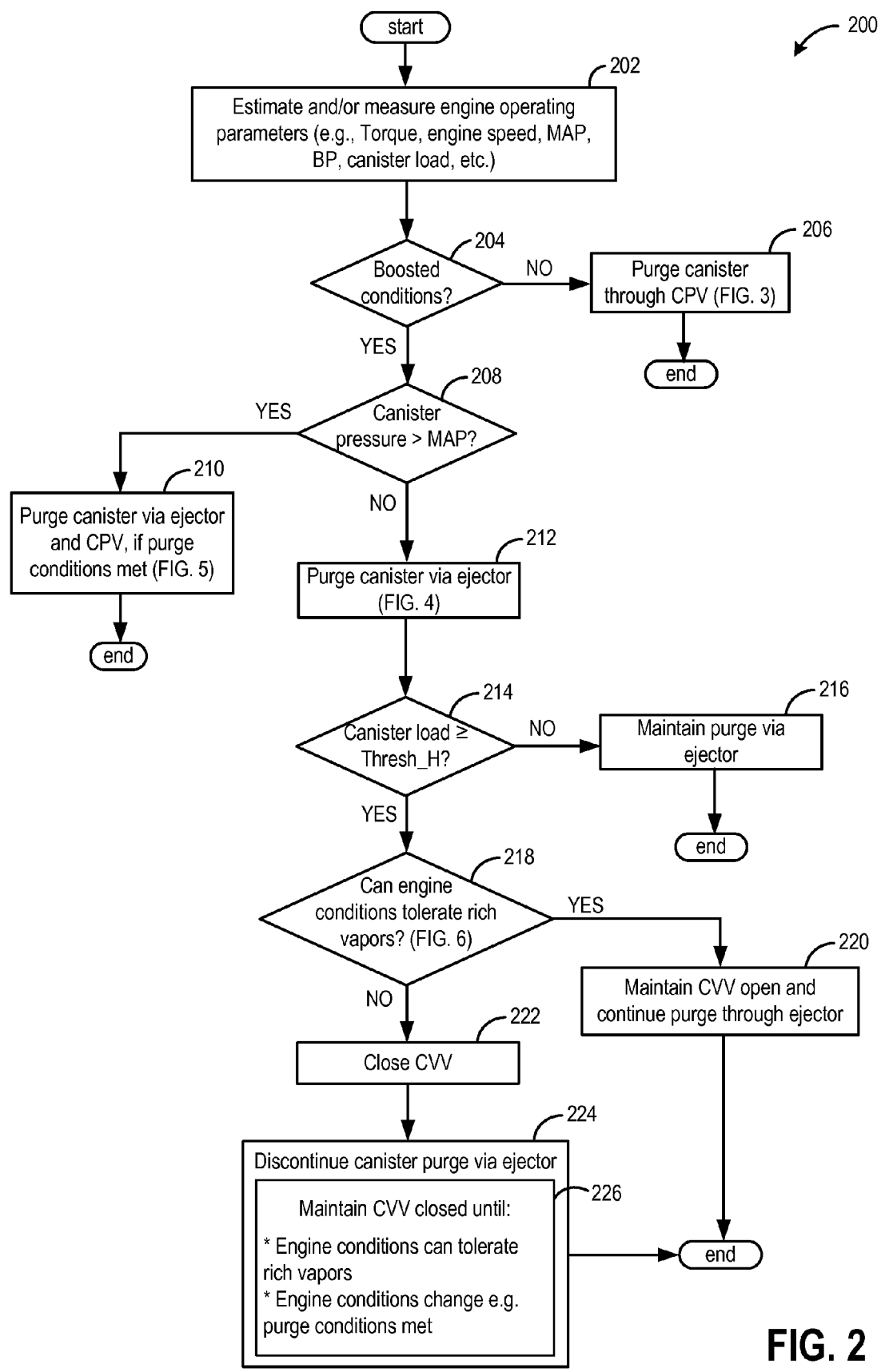
FIG. 2 presents a high level flowchart illustrating control of purge flow into the ejector during boosted conditions, in accordance with the present disclosure.

Turning now to FIG. 2, it depicts an example routine 200 for performing a canister purging based on whether boosted conditions are present or absent in an engine system, such as engine system 100 of FIG. 1. Specifically, during non-boosted conditions, purged fuel vapors may be directed into the intake manifold via the canister purge valve (CPV). During boosted conditions, depending on canister pressure and manifold pressure, purged fuel vapors may be directed into an inlet of the compressor, and/or into the intake manifold. Further, purging into the inlet of the compressor may be controlled based on a saturation level of the canister.

Instructions for carrying out routine 200 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below.

At 202, engine operating parameters such as torque demand, engine speed, barometric pressure (BP), MAP, air-fuel ratio, canister load, etc. may be estimated and/or measured. For example, manifold pressure may be sensed via a manifold pressure sensor (e.g., sensor 162 in FIG. 1). Further, air-fuel ratio may be measured by an output of an exhaust sensor coupled to the exhaust manifold in the engine.

At 204, routine 200 may determine if boost conditions are present. In one example, boosted conditions may be confirmed when throttle inlet pressure is higher than an atmospheric pressure. Throttle inlet pressure or boost pressure may be measured by TIP sensor 161 of FIG. 1. In another example, boost conditions may be confirmed if one or more of a higher engine load and a super-atmospheric intake condition is/are present.

If boosted conditions are not determined at 204, the engine may be in a non-boosted condition, such as an engine idling condition. During non-boosted conditions, pressure in the intake manifold may be low enough to draw purged fuel vapors through the CPV, such as CPV 163 of FIG. 1. Thereupon, routine 200 proceeds to 206 to carry out a purge operation via the CPV. The purge operation will be described in reference to routine 300 of FIG. 3. Routine 200 may then end.

If it is determined at 204 that boosted conditions are present, routine 200 continues to 208 to determine if canister pressure is greater than manifold pressure. Canister pressure may be substantially at or near atmospheric pressure when the canister vent valve (CVV) is open. As such, the CVV may be largely maintained at an open position. Accordingly, canister pressure may represent atmospheric pressure. In another example, if the VBV is open, canister pressure may be substantially equal to fuel tank pressure. If it is determined that canister pressure is greater than manifold pressure under boosted conditions, routine 200 proceeds to 210 to purge the canister via each of the ejector and the CPV, if purge conditions are met. Manifold pressure may be lower than canister pressure (or atmospheric pressure) based on a position of the intake throttle. For example, if the intake throttle is at a partly closed position, manifold pressure may be reduced relative to boost pressure (measured at throttle inlet) as well as atmospheric pressure. Herein, purge flow may be streamed via both conduits, e.g. first conduit 158 and second conduit 156, into the engine. Accordingly, at 210, routine 500 of FIG. 5 may be activated. Routine 200 may then end. Routine 500 will be described further below.

On the other hand, if it is confirmed that canister pressure is not greater than manifold pressure (MAP) during boosted conditions, routine 200 continues to 212 to purge the canister primarily via the ejector. Since boosted conditions are present, the ejector may generate adequate vacuum via diverted compressed air motive flow through the ejector. Further, this ejector vacuum may draw stored fuel vapors from the fuel system canister. This purge routine will be described further in reference to FIG. 4 below.

Next, at 214, routine 200 determines if canister load is higher than or substantially equivalent to a threshold load, Thresh_H. Canister load may represent a saturation level of the fuel system canister. In other words, canister load may represent an amount of fuel vapors stored in the canister. If the canister is substantially saturated wherein a hydrocarbon load of the canister is significantly higher, the purge flow may primarily consist of fuel vapors with a smaller quantity of air. However, if the canister is practically empty, canister purge may primarily be composed of air and a smaller fuel vapor concentration. In one example, when the canister is considerably full, purging the canister might produce higher fuel vapor concentration (also termed, rich vapor purge) in the purge flow. Certain engine operating conditions may not desire additional fuel vapors than those supplied by fuel injectors. For example, when fuel demand is lower (e.g., during deceleration) and the pulse width of fuel injectors is adjusted to a lower setting (e.g., a minimal pulse width), the engine may not desire rich fuel vapors from the canister. Accordingly, the controller monitors the saturation level (e.g., stored fuel vapors amount) in the canister. As described earlier, canister load may be based on a learned vapor amount/concentration during a previous purging operation. Controller 112 may maintain a running estimate of fuel vapor concentration in the purge flow. Alternatively, a sensor coupled to the purge conduit 125, such as sensor 138 of FIG. 1, may determine a loading state of the fuel system canister. In another example, the fuel system canister load may be based on the number and duration of refueling events that have occurred following a previous canister purging event. The threshold load, Thresh_H, may be determined as a percentage. Thus, Thresh_H may, in one example, be 75% of the canister loading capacity. In another example, Thresh_H may be 95% of the canister storage capacity. In an alternative embodiment, threshold load, Thresh_H, may be based on fuel vapor concentration estimate in a previous purge flow. In one example, Thresh_H may be 70% fuel vapor concentration. In another example, the threshold load of the canister, Thresh_H, based on fuel vapor concentration may be 80%.

If it is determined at 214 that the canister load is lower than the threshold load, routine 200 progresses to 216 to maintain purge flow via the ejector. Routine 200 then ends. However, if canister load is determined to be higher than the threshold load, Thresh_H, routine 200 continues to 218 to determine if existing engine conditions can tolerate rich vapors from the canister purge. Herein, routine 600 of FIG. 6 may be activated to determine if existing engine conditions can control a rich vapor purge. Routine 600 will be described further below. Conditions that tolerate rich vapors may include tip-in conditions and steady-state cruising conditions. If it is determined that the engine can tolerate the rich vapor purge, the CVV is maintained open at 220 and purge through the ejector may continue. Routine 200 may then end.

However, if existing engine conditions cannot tolerate rich vapors, routine 200 progresses to 222 to close the CVV. Engine conditions that may not tolerate rich vapor purge include conditions with lower engine air flow rates such as deceleration conditions. In another example, engine conditions that cannot tolerate higher fuel vapor flow rates may include conditions when a more precise control of air-fuel ratio is desired.

By closing the CVV, fresh air may not be drawn into the canister and purge flow through the canister may be terminated. As such, a solenoid within the CVV may be disabled (e.g. adjusted closed) by the controller. In an example fuel system including a fuel tank isolation valve (FTIV) between the fuel tank and the canister, the FTIV may also be adjusted closed in response to the higher saturation level of the canister. By closing the FTIV (or the VBV), unintentional drawing of fuel vapors from the fuel tank may be reduced.

Next at 224, purge flow through the ejector is discontinued. Further, at 226, the CVV is maintained closed until engine conditions change such that they can tolerate the richer vapors from a more saturated canister. In another example, the CVV is maintained closed until engine conditions change such that purging conditions are met for a purge operation via the CPV. In response to the change in engine conditions and/or purge conditions being met, the CVV may be opened (e.g., adjusted to fully open) and purge flow via the ejector and/or the CPV, respectively, may be commenced. To elaborate, a change in engine conditions, such as a change from engine conditions that cannot tolerate rich vapor purge to those that can tolerate rich vapor purge, may enable adjusting the CVV to fully open to initiate purge flow to the ejector. For example, if engine conditions change from deceleration conditions to steady state cruising conditions, the CVV may be fully opened (from closed) to enable purge flow into the ejector suction port. Routine 200 then ends.

Thus, the CVV can be adjusted between open and closed (e.g., fully open and fully closed) to control purge flow through the ejector based on the saturation level of the canister and existing engine conditions. The use of the CVV as a purge control valve for ejector purge may be particularly helpful in systems wherein purge flow between the fuel system canister and the ejector suction port does not include a control valve. Similarly, an engine system, such as engine system 100, which does not include a shut-off valve in the compressor bypass passage to control motive flow through the aspirator, can also use the CVV to control purge flow into the ejector. In this way, by using the CVV for regulating purge into the canister, the costs of an additional valve to control purge flow to the ejector in these systems may be spared.

Turning now to FIG. 3, it shows routine 300 demonstrating a purging operation through the canister purge valve (CPV). Specifically, purge flow through the CPV alone may occur during non-boosted conditions when the manifold pressure is significantly lower. For example, the intake manifold may be at a negative pressure relative to atmospheric pressure. Non-boosted conditions may include idle conditions, conditions when the intake throttle is substantially closed, etc.

Instructions for carrying out routine 300 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below. It will be noted that the controller may carry out certain parts of routine 300 whereas other parts of routine 300 may occur due to adjustments to the valves, existing hardware, etc.

At 302, routine 300 determines if purge conditions are met. Purging conditions may be confirmed based on various engine and vehicle operating parameters, including an amount of hydrocarbons stored in canister 122 being greater than a second threshold (e.g., different from threshold load, Thresh_H of routine 200), the temperature of an emission catalyst being greater than a threshold temperature, fuel temperature, the number of engine starts since the last purge operation (such as the number of starts being greater than a threshold number), a duration elapsed since the last purge operation, fuel properties, and various others. An amount of fuel vapors stored in the fuel system canister may be estimated based on a learned vapor amount/concentration at the end of a previous purging cycle. The amount of fuel vapors stored in the fuel system canister may be further estimated based on engine and vehicle operating conditions including a frequency of refueling events and/or frequency and duration of previous purging cycles.

If purging conditions are not confirmed and not met at 302, routine 300 progresses to 304 and the canister is not purged via the CPV, and routine 300 ends. In alternative embodiments, a purging routine may be initiated by the controller based on existing engine conditions. For example, if the emission treatment device has achieved light-off, purging may be initiated even when canister load is less than the second threshold to further reduce stored hydrocarbon levels. It will be appreciated that the second threshold for canister load may be lower than the threshold load, Thresh_H. Alternatively, the second threshold may be the same as threshold load, Thresh_H.

If purging conditions are met at 302, routine 300 continues to 306 to adjust various valves for the purge operation through the CPV. Accordingly, at 308, the canister vent valve (e.g., CVV 120) may be maintained open or opened from a closed position, at 310 the FTIV (if present) may be closed (from an open position), and at 312 the CPV (e.g., CPV 163 of FIG. 1) may be opened.

As such, opening of CPV 163 includes communicating a pulse width modulated signal to solenoid valve 173 which may be pulsed in an open/closed mode. Solenoid valve 173 may be a fast response valve. In one example, the solenoid valve may be pulsed at 10 Hz. The pulse width modulated signal may vary the duration of open valve time to control an average purge flow rate. Further, the opening and closing of the solenoid valve may be synchronized with engine cylinder combustion events.

Fresh air may be drawn through the vent line via the CVV into the canister enabling desorption of stored fuel vapors. In reference to FIG. 1, with the opening of the CPV 163, desorbed fuel vapors may flow (with air) from the fuel vapor canister 122 through purge conduit 125, past first conduit 158, and through CPV 163 via solenoid valve 173, through sonic choke 175, past purge path 159 into intake manifold 144 of engine system 100.

Thus, at 314, intake manifold vacuum may draw stored fuel vapors from the canister via the CPV. Flow of purged vapors through the CPV includes flowing the purged vapors through the solenoid valve in the CPV, at 316, and then flowing these purged vapors through the sonic choke in the CPV, at 318. These stored fuel vapors may bypass the ejector at 320 since, during non-boosted conditions, vacuum may not be generated at the ejector. Specifically, purge flow through the CPV does not flow through the ejector in the compressor bypass passage. In some examples, a nominal flow of fuel vapors through the ejector may occur.

Purged fuel vapors flowing through the CPV may be received in the intake manifold. Specifically, at 322, purged vapors may be received from the sonic choke of the CPV in the intake manifold downstream of the intake throttle (e.g., intake throttle 165). Further, these purged vapors may be delivered into combustion chambers for combustion. Based on an amount of fuel vapors received in the manifold from the canister, engine fueling by fuel injectors may be adjusted. Accordingly, at 324, fuel injection timing and/or fuel injection amount may be modified based on the quantity of purged fuel vapors received from the canister in the intake manifold. For example, fueling via fuel injectors may be decreased as purged fuel vapor concentration increases so as to maintain combustion at stoichiometry. Routine 300 then ends.

Turning now to FIG. 4, it depicts routine 400 for purging the fuel vapor canister primarily via the aspirator. Specifically, ejector vacuum generated during boosted conditions may be used to draw stored fuel vapors from the fuel system canister. Boosted conditions include throttle inlet pressure being significantly greater than atmospheric pressure.

Instructions for carrying out routine 400 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below. It will be noted that the controller may carry out certain parts of routine 400 whereas other parts of routine 400 may occur due to adjustments to the valves, hardware, etc.

At 402, routine 400 adjusts the position of various valves to enable purge operation via the ejector. The CPV may be closed at 404 such that purge flow does not occur via the CPV, at 406. As such, the controller may not send a PWM signal to the CPV. If optional check valve 153 is included in the engine embodiment, the CPV may not be closed during boosted conditions. To elaborate, the CPV may not be closed when manifold pressure is higher than canister pressure if optional check valve 153 is present in purge path 159. Further, at 408, the FTIV, if present, may be closed. At the same time, at 408, the CVV may be maintained open or opened, if closed previously, to draw fresh air from the atmosphere into the canister.

Next, at 410, compressed air may be streamed from downstream of the compressor 114 and upstream of intake throttle 165, through the aspirator 180, towards the compressor inlet of engine system 100. Specifically, compressed air may be diverted from downstream of the compressor via the compressor bypass passage and through the aspirator coupled within the compressor bypass passage. This motive flow of compressed air through the ejector generates a vacuum.

It will be noted that mixed flow from the motive outlet of ejector may not include compressed air. Once the air flowing through the ejector (diverted from downstream of compressor) is discharged from the ejector, it is no longer compressed. The mixed flow exiting the ejector may be at or near ambient pressure.

At 412, vacuum may be drawn at the neck of the aspirator, and applied to the canister. Accordingly, at 414, stored vapors from the canister are drawn into the suction port of the aspirator. To elaborate with reference to FIG. 1, fresh air may be drawn via the vent line 117 through the CVV 120 into the canister 122 enabling desorption of stored fuel vapors. These desorbed vapors may be drawn by the ejector vacuum through purge conduit 125, past node 155 into second conduit 156, across check valve 154 into suction port 194 of ejector 180.

At 416, fuel vapors from the canister received at the suction port of the ejector may be transferred to the compressor inlet, and thereon into the intake manifold past the intake throttle. In other words, fuel vapors may mix with compressed air in the aspirator and exit the motive outlet of the aspirator towards first end 145 of first passage 186 of bypass passage 190. Thus, the fuel vapors may be delivered to the intake passage upstream of compressor 114.

During boosted conditions when the ejector is generating vacuum and the intake manifold is at a higher pressure than atmospheric, purge vapor flow bypasses the CPV, at 418. Herein, purge flow may primarily occur via the ejector, as described in routine 400. Next, at 420, the controller adjusts one or more of fuel injection timing and fuel injection amount based on the fuel vapors received in the intake manifold via the compressor inlet. Routine 400 then ends.

FIG. 5 illustrates routine 500 for a purging operation wherein desorbed fuel vapors from the fuel vapor canister are purged via the ejector as well as the CPV. Specifically, during boosted conditions if the manifold pressure is lower than canister pressure, and purge conditions are met, the CPV may be opened to enable purge directly into the intake manifold along with purge flow to the ejector.

Instructions for carrying out routine 500 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below. It will be noted that the controller may carry out certain parts of routine 500 whereas other parts of routine 500 may occur due to adjustments to the valves, existing hardware, etc.

At 502, routine 500 may determine if canister pressure is greater than pressure in the engine intake manifold during boosted conditions. In other words, it may be determined if manifold pressure is lower than canister pressure. As described earlier in reference to 208 in routine 200, canister pressure may be substantially equivalent to atmospheric pressure since the CVV is mostly maintained open. In an alternative embodiment, canister pressure may be measured by a pressure sensor. In yet another embodiment, canister pressure may be substantially equal to fuel tank pressure when the VBV is opened. If canister pressure is determined to be lower than manifold pressure during boosted conditions, routine 500 proceeds to 504 to not continue with the routine 500. Further, at 504, purge flow may occur primarily via aspirator vacuum as described earlier in reference to routine 400. Routine 500 then ends.

If canister pressure is confirmed to be greater than manifold pressure during boosted conditions, routine 500 continues to 506 to confirm that purge conditions are met. Purge conditions similar to those described earlier in reference to 302 of routine 300 may be used herein. If purge conditions are not met, routine 500 continues to 508 and the CPV is not opened. Further at 510, purge flow may occur primarily via the ejector (routine 400). Routine 500 then ends.

If, however, purge conditions are met at 506, routine 500 continues to 512 to adjust the positions of different valves for simultaneous purge flow via the CPV and the aspirator. At 514, the CVV (e.g., CVV 120) is maintained open or opened (from a closed position) to draw fresh air from the atmosphere into the canister. Next, at 516, the FTIV (if present) may be closed from an open position or may be maintained closed. Further, at 518, the CPV may be opened. As explained earlier, the CPV may be pulsed open and closed at a given frequency. An example frequency may be 10 Hz.

Once the valves are adjusted to their positions, desorbed fuel vapors from the canister may concurrently flow through the CPV and via the aspirator. Accordingly, a first portion of fuel vapors may flow through the aspirator as follows: at 522, compressed air from downstream of the compressor and upstream of the intake throttle may be directed through the aspirator in the compressor bypass passage. This motive flow of compressed air through the aspirator enables a vacuum to be drawn at the neck of the aspirator, at 524, which may then be directly applied to the fuel vapor canister. At 526, this applied vacuum may draw the first portion of purged fuel vapors from the canister to the compressor inlet via the aspirator. Further, at 536, based on the amount of vapors received in the intake manifold (via the compressor inlet and the CPV), fuel injection amount and/or timing may be adjusted to maintain engine combustion at a desired air-fuel ratio, such as stoichiometry.

At the same time, a second portion of fuel vapors (or additional vapors) may flow through the solenoid valve and the sonic choke in the CPV as follows: at 528, manifold pressure, being lower than canister pressure, may draw purged vapors from the canister through the CPV. As 530, the vapors may stream first through the solenoid valve in the CPV, and then at 532, flow through the sonic choke positioned downstream of the solenoid valve in the CPV.

Purged vapors may be received at 534 from the sonic choke of the CPV directly into the intake manifold downstream of the intake throttle. Further, at 536, engine fueling may be adjusted by modifying the fuel injection amount and/or timing to maintain stoichiometric combustion. It will be noted that engine fueling may be adjusted based on both the first portion of purged fuel vapors received via the aspirator and compressor inlet as well as the second portion of the purged fuel vapors received via the CPV. The second portion of fuel vapors may be additional vapors to fuel vapors purged via the ejector.

Thus, during boosted conditions when manifold pressure is lower than canister pressure, purge flow may occur from the fuel vapor canister 122 via purge conduit 125 through two paths: first conduit 158 and second conduit 156. Desorbed fuel vapors from the canister may flow through each of purge conduit 125, first conduit 158, through CPV 163 and purge path 159 into intake manifold 144, and through purge conduit 125, second conduit 156, past check valve 154, and into suction port 194 of aspirator 180. Vapors received at entraining inlet 194 of aspirator 180 may then flow via first passage 186 and enter the compressor inlet at first end 145 of compressor bypass passage located upstream of compressor 114.

Thus, the described example embodiment may enable a more complete purging of a fuel vapor canister by providing an alternative and additional purge path for desorbed fuel vapors via an aspirator that is not encumbered by a flow restriction such as a sonic choke. Stored fuel vapors from the fuel system canister may flow into an engine intake during boosted conditions via the sonic choke and/or via the aspirator in the compressor bypass passage. Flow into the intake manifold via the sonic choke may occur only when canister pressure is higher than the manifold pressure. Further, during non-boosted conditions such as engine idle, the aspirator may not generate sufficient vacuum. As such, during non-boosted conditions, vacuum in the intake manifold may draw desorbed vapors from the canister more easily. Since a higher pressure difference may be present between the canister and the intake manifold, purge flow may largely occur via the CPV.

Further still, during boosted conditions, purge flow may occur through the aspirator as long as a vacuum is generated by the aspirator during motive flow through the aspirator. However, certain engine conditions may not desire additional fuel vapors (e.g., supplementary to fuel injection from fuel injectors) such as deceleration conditions. Herein, the CVV may be adjusted to fully closed, from fully open, and purge flow through the aspirator may be ceased.

As such, the tolerance of rich fuel vapor purge by the engine may increase with engine air flow rate. For example, as engine torque increases, a higher engine air flow rate may be present. During conditions when engine power is higher, the engine may tolerate a higher fuel vapor concentration from canister purge. Thus, in one example, during a tip-in event, the engine may have a higher tolerance for rich fuel vapor purge. Engine tolerance for rich fuel vapor purge may be due to fuel mass in the purge flow being smaller (e.g. 20%) relative to the fuel portion provided by the fuel injectors.

Turning now to FIG. 6, it shows routine 600 for determining whether engine conditions can tolerate receiving a rich purge from the fuel vapor canister. Specifically, routine 600 may determine if existing engine conditions include conditions with lower intake air flow rates and/or conditions where a precise control of air-fuel ratio is desired. Routine 600 may be activated after determining that canister load is higher than the threshold load, Thresh_H (e.g., 214 of routine 200) during boosted conditions in the engine.

Instructions for carrying out routine 600 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below.

At 602, routine 600 determines if deceleration conditions exist. Deceleration conditions include a tip-out event where an accelerator pedal may be fully released and/or torque demand decreases at a rate faster than a threshold. Herein, fuel injectors may be set to a lower pulse width setting (e.g., minimum pulse width setting) such that smaller quantities of fuel may be delivered to the engine. In another example, deceleration conditions can also include deceleration fuel shut-off wherein fuel delivery to engine cylinders via fuel injectors is discontinued to improve fuel economy. Further still, air flow rate into the engine during deceleration conditions may be lower. Accordingly, engine tolerance for rich vapor purge from a saturated fuel vapor canister may be lower. If deceleration conditions are existent, routine 600 continues to 604 to determine that engine conditions cannot tolerate a rich vapor purge. Specifically, purge flow comprising largely of fuel vapors (e.g., 80-100% fuel vapor concentration) may not be desired at the aspirator suction port. Accordingly, the CVV may be commanded closed (as shown in routine 200 of FIG. 2) in response to determining that engine conditions cannot tolerate higher fuel vapor concentration in the purge. Routine 600 then ends.

If deceleration conditions are not determined at 602, routine 600 proceeds to 606 to determine if a tip-in event is occurring. For example, it may be determined if the torque demand has increased by more than a threshold amount within a threshold time, and/or whether the accelerator pedal has been depressed by more than a threshold amount. As explained earlier, a higher air flow rate into the engine may exist during the tip-in event. The higher air flow enhances engine tolerance for rich vapor purge (e.g., fuel vapor concentration in purge flow being higher than a threshold concentration). If it is determined at 606 that a tip-in event is occurring, routine 600 continues to 608 to determine that the engine conditions can accommodate additional fueling via rich fuel vapors from a canister purge via the ejector. Accordingly, the CVV may be maintained open in response to determining the tip-in event, as at 220 of routine 200.

If the tip-in event is not confirmed at 606, routine 600 moves to 610 to determine if cruising conditions exist. As such, steady-state cruising conditions may be determined based on a change in speed being lower than a threshold. Steady-state cruising conditions may, in another example, be determined by monitoring a change in engine load. When engine load is relatively steady during driving, the engine may be operating in steady-state. As such, steady state cruising conditions also include sufficient engine air flow rates that can accommodate a higher fuel vapor concentration in a purge flow.

If it is confirmed at 610 that steady state cruising conditions exist, routine 600 progresses to 612 to determine that engine conditions can tolerate rich vapor purge. During steady-state cruising conditions, the engine may be boosted and can receive additional fuel vapors (e.g. rich vapors) from the canister. Routine 600 may then end. If cruising conditions are not determined, routine 600 ends. As such, routine 600 may return to start.

Thus, the controller may determine if the engine is undergoing a deceleration event and may determine the position of the CVV based on engine tolerance for receiving rich fuel vapors from the canister. As such, engine conditions with lower engine air flow rates may not tolerate higher fuel vapor concentration in purge flow. In these situations, if the engine receives a substantial quantity of fuel vapors from purge flow into the compressor inlet (via the ejector), there may be a likelihood of fueling errors resulting in combustion instability as well as reduction in engine efficiency. On the other hand, transient decreases in torque demand may include conditions when fueling via fuel injectors may be significantly reduced. Herein, additional fuel vapors from the canister may affect engine control. Accordingly, the CVV may be closed (from open) to terminate purge flow to the ejector to improve engine performance during transients.

Engine tolerance of concentrated fuel vapors in purge flow may be a function of a fraction of fuel vapors in purge flow. In other words, determining if engine conditions can tolerate a fuel vapor rich purge flow from the canister via the ejector may be based on the concentration of fuel vapors in the purge flow. As such, estimation of fuel vapor concentration in purge flow may not provide accurate results. Further, assessing total purge flow rate may also not be precise. Since fuel vapor flow rate is a product of fuel vapor concentration and purge flow rate, estimating fuel vapor flow rate may also be imprecise. However, in relation to the aforementioned estimates, fuel injection amounts via a fuel injector may be more precisely calculated and controlled.

Furthermore, fuel vapors via purge flow through the ejector suction port may be added into the intake passage with fresh intake air farther upstream relative to a location where fuel via fuel injectors is injected. In other words, fuel vapors received at the suction port of the ejector from the canister may be streamed into the engine intake upstream of the compressor (as shown in FIG. 1) while fuel injectors (such as those coupled to engine cylinders or intake ports of engine cylinders) deliver fuel either directly into cylinders of the engine (e.g., direct injection) or into an intake port of each cylinder of the engine (e.g., port injection).

The combination of uncertainty in the amount of fuel vapors in the purge flow as well as the entry of purged fuel vapors at a location upstream of the compressor and distant from engine cylinders may imply a lack of fuel control. Thus, purged fuel vapors received in the intake passage via the ejector may represent a more uncertain and less controllable fuel flow. Accordingly, these purged fuel vapors may be controlled to form a lesser portion of fuel supply to the engine. During lower air flow rates into the engine, these purged fuel vapors may be ceased or reduced to a nominal (e.g., minimal) flow. During higher engine air flow rates, a higher proportion of purged fuel vapors may be absorbed into the engine without adversely affecting engine control. Tip-in events with higher acceleration and higher air flow rates can thus absorb rich fuel vapor purges.

While the CVV may be adjusted closed to cease purge flow into the ejector when canister load is higher than the threshold load, Thresh_H, during deceleration conditions, the controller may adjust the position of the CVV (e.g., fully open or fully closed) during additional conditions which will be described below in reference to routines 700, 800, and 900.

Figure 7:
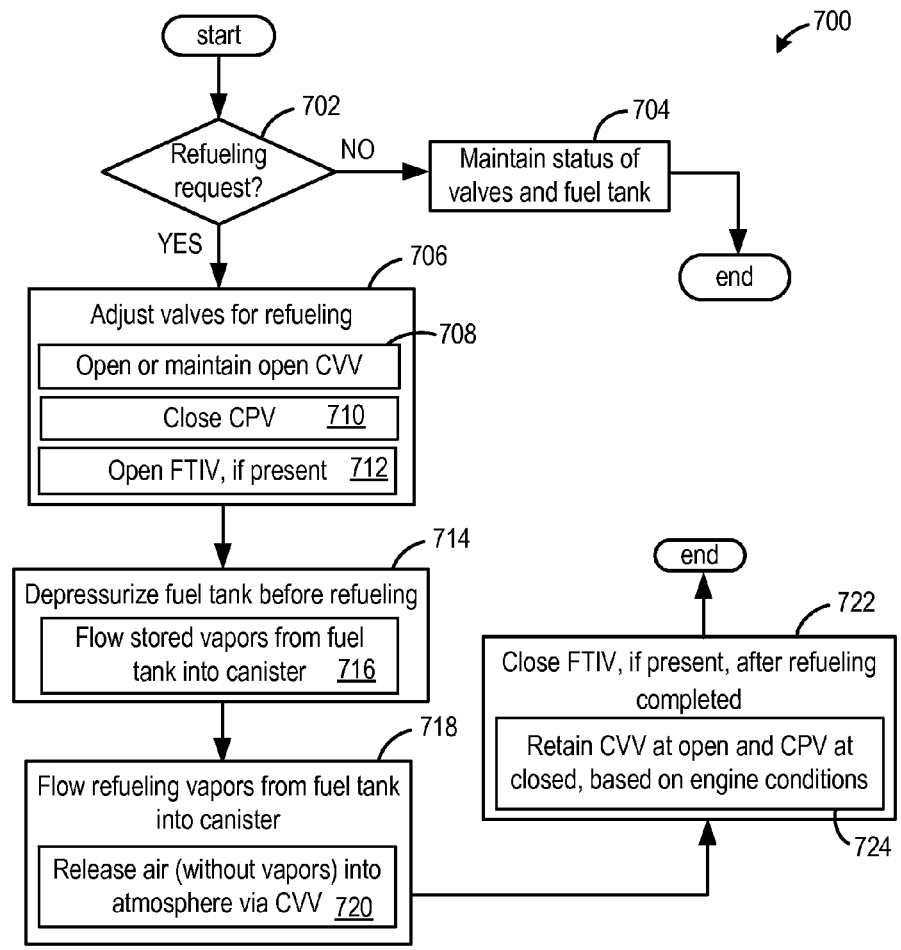
FIG. 7 depicts a high level flow chart illustrating a fuel tank refueling.

FIG. 7 includes example routine 700 for a refueling operation in a vehicle including an engine system such as engine system 100. Specifically, routine 700 depicts adjustments to the valves of the fuel system and the canister system prior to beginning refueling as well as during refueling.

Instructions for carrying out routine 700 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below. It will be noted that the controller may carry out certain parts of routine 700 whereas other parts of routine 700 may occur due to adjustments to the valves, existing hardware, etc.

At 702, routine 700 determines if a refueling request is received. The refueling request may be inferred by a vehicle operator (or a refueling attendant) opening a refueling door to the fuel tank. In another example, such as in a hybrid vehicle, the vehicle operator may press a refuel request button. If a refueling request is not received, routine 700 moves to 704 to maintain the status of various valves and the fuel tank. Further, routine 700 ends.

If, however, it is confirmed that the refueling request has been received, routine 700 continues to 706 to adjust valves for refueling. At 708, the CVV is maintained open (if, already open) or opened (if closed) to fluidically couple the canister to the atmosphere. At 710, the CPV is closed to reduce a likelihood of refueling vapors entering the intake manifold. At 712, the FTIV (if present), is opened to enable fluidic communication between the fuel tank and the canister.

Next, at 714, routine 700 includes depressurizing the fuel tank before refueling. Accordingly, at 716, fuel vapors within the fuel tank may be transferred to the fuel vapor canister. Fuel vapors along with air may flow from the fuel tank into the canister. Herein, fuel vapors may be adsorbed within the adsorbent in the canister while air, stripped off fuel vapors, exits the canister into the atmosphere via the CVV.

Once the fuel tank is sufficiently depressurized (e.g. fuel tank pressure is lower than a pressure threshold), refueling may begin. In one example, a refueling lock may be unlocked, if present, to enable access to the fuel tank. At 718, as the fuel tank is filled, refueling vapors may be streamed from the fuel tank into the canister. At 720, once fuel vapors are adsorbed within the canister, air is released into the atmosphere via the CVV and the vent line coupled to the canister.

Next, at 722, once refueling is completed, the FTIV (if present) is closed to block fluidic communication between the fuel tank and the canister. At 724, the CVV is retained open while the CPV is retained closed. Optionally, based on existing engine conditions, the positions of the CVV and the CPV may be adjusted. For example, after engine restart, the CVV may be adjusted closed if the canister is saturated (e.g., canister load greater than the threshold load, Thresh_H) and a precise control of air-fuel ratio is desired. In another example, if a prolonged idle condition is occurring, the CVV may be retained open and the CPV may be opened to enable canister purge.

Thus, the CVV and the CPV may be adjusted in a different manner during a refueling operation.

Turning now to FIG. 8, it demonstrates routine 800 for adjusting states (positions) of the CVV and the CPV based on engine conditions. Specifically, the routine 800 may determine an initial position for the two valves and then based on engine operating conditions, including based on engine transients, etc., the positions of the two valves may be further modified.

Instructions for carrying out routine 800 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below.

At 802, routine 800 includes estimating and/or measuring engine operating conditions. These may include, for example, engine speed, torque demand, catalyst temperature, engine temperature, exhaust air-fuel ratio, MAP, MAF, barometric pressure, etc. At 804, based on the estimated engine operating conditions, an initial valve position may be determined for each of the CVV and the CPV. For example, at steady state boosted conditions, the CVV may be adjusted to a fully open position to enable canister purge via the ejector. In another example, if purging conditions such as those described earlier in reference to routine 300 are not met, the CPV may be maintained closed or inoperative.

At 806, it may be determined if engine cold start conditions are present. A cold engine start may include cranking the engine from rest via a motor, such as a starter motor, when the engine temperature is lower than an operating temperature. Further, during an engine cold start, an emission treatment device in the exhaust may not have attained light-off temperature. Furthermore, a turbocharger spool-up in a turbocharged system in preparation for tip-in may be anticipated at the engine start. If an engine cold start is not confirmed, routine 800 proceeds to 810. If, on the other hand, engine cold start conditions are present, the CVV may be temporarily closed at 808 to impede canister purge via the ejector. Further still, the CPV may be closed or maintained closed at 808 to disable purge operation via the CPV. Thus, each of the paths (e.g., via ejector and via CPV) for canister purge may be blocked to reduce fueling errors during the cold start.

Routine 800 then proceeds to 810 where it may be determined if there is a sudden increase in torque demand (e.g., due to a tip-in). If no, routine 800 continues to 814. If yes, routine 800 proceeds to 812 to maintain the CVV at open. Alternatively, the CVV may be adjusted to a fully open position if previously at a closed position. By maintaining the CVV open, fresh air may be drawn into the canister and purge flow from the canister may be delivered into the ejector. As such, a tip-in event involves boosted conditions wherein the ejector may generate adequate vacuum for drawing fuel vapors from the canister. If the canister load is higher than the threshold load, Thresh_H of routine 200, the CVV is maintained open to enable transfer of rich vapors to the compressor inlet. Since engine air flow rates during tip-in events may be significantly higher, the engine can tolerate rich vapor purge from the canister. The CPV may be closed or maintained closed at 812. If a purging operation was active prior to the tip-in, the purging may be discontinued by closing the CPV. As such, during the boosted conditions at tip-in, pressure in the intake manifold may be higher than atmospheric, and may not draw fuel vapors from the canister via the CPV.

Next, routine 800 continues to 814 to determine if there is a sudden decrease in torque demand (e.g., due to a tip-out). If no, routine 800 continues to 818. If yes, routine 800 progresses to 816, to close the CVV. As described earlier in reference to routine 600, during deceleration conditions such as a tip-out event, fuel demand may be considerably lower. Further still, engine air flow rates may also be lower during deceleration. In response to this decrease in fuel demand and reduced air flow rates into the engine, the CVV may be closed to reduce the likelihood of additional fuel vapor ingestion into the engine intake via the ejector. Further, the CPV may be closed or maintained closed to reduce the flow of fuel vapors into the engine intake during the reduction in torque demand. Further, if the canister load is higher than the threshold load, Thresh_H, the CVV is closed to reduce a likelihood of the engine receiving a rich purge flow.

Next, at 818, routine 800 may confirm if the engine is in an idling condition. Engine idling may be an example of a non-boosted condition wherein the compressor may not be providing boosted air into the intake. Further, during idle, the intake throttle may be mostly closed or fully closed resulting in higher levels of manifold vacuum. If an idling condition is confirmed, routine 800 proceeds to 820 to open the CPV and take advantage of the manifold vacuum in drawing stored fuel vapors from the fuel vapor canister. However, the CPV may be opened based on purging conditions being met. Further, the CVV may be opened to enable canister purge via the CPV. Alternatively, if purging conditions are not met during engine idle, the CPV may be adjusted closed. However, the CVV may be maintained open, since the ejector may not be generating significant vacuum during these non-boosted conditions to draw fuel vapors from the canister into the suction port of the ejector. If idle conditions are not met at 818, routine 800 progresses to 822.

At 822, routine 800 determines if boosted conditions are present wherein the manifold pressure is higher than canister pressure. If yes, at 824, the CVV may be opened or maintained open and the CPV may be closed. Since manifold pressure is higher than canister pressure, purge flow may occur only via the aspirator and may bypass the CPV, as described in routine 400. If not, routine 800 continues to 826 to confirm if boosted conditions are present wherein the manifold pressure is lower than canister pressure. If yes, at 828, the CVV may be opened or maintained open and the CPV may be activated to open. As such, the opening of the CPV may be based on purging conditions being met. Thus, with the CVV and the CPV being opened, purge flow may occur simultaneously through two different paths: via the aspirator and via the CPV, as described in routine 500.

It will be noted that adjustments of the CVV, particularly an adjustment to the closed position, may be temporary until transient engine conditions exist. For example, at the end of a tip-in event if steady-state cruising conditions have been attained, the CVV may be opened.

Thus, in another representation, a method for purging a canister may comprise during boosted conditions, drawing fresh air through a canister vent valve, the canister vent valve coupled to the canister, and streaming stored fuel vapors from the canister into a suction port of an ejector coupled in a compressor bypass passage, and in response to a change in engine conditions, adjusting the canister vent valve to discontinue purging. The method may further comprise maintaining a canister purge valve closed during boosted conditions when an intake manifold pressure is higher than canister pressure. Further, during boosted conditions and when the intake manifold pressure is lower than canister pressure, the canister purge valve may be opened and additional stored fuel vapors may be streamed from the canister via the canister purge valve into an intake manifold, while simultaneously flowing stored fuel vapors from the canister into the suction port of the ejector. The change in engine conditions may include a tip-out event, and the adjusting may include closing the canister vent valve, and may further include closing the canister purge valve, to discontinue purging stored fuel vapors from the canister into each of the suction port of the ejector and the canister purge valve.

The method may also comprise, during non-boosted conditions when the intake manifold pressure is lower than barometric pressure, opening the canister vent valve, drawing fresh air through the canister vent valve, and flowing stored fuel vapors from the canister into the intake manifold via the canister purge valve, the flowing bypassing the suction port of the ejector. Non-boosted conditions may include engine idle conditions. The method may further comprise, in response to an engine cold start, closing each of the canister vent valve and the canister purge valve, and discontinuing purging stored fuel vapors from the canister into the intake manifold via the canister purge valve.

FIG. 9 depicts example routine 900 for diagnosing a fuel system in an engine system, such as engine system 100, for leaks. Specifically, the fuel system including the fuel vapor canister may be pressurized (e.g., with positive pressure or negative pressure) and monitored for a change in pressure to determine the presence of leaks. Herein, a negative pressure may be also termed vacuum.

Instructions for carrying out routine 900 may be executed by a controller, such as controller 112 of FIG. 1, based on instructions stored on a memory of the controller and in conjunction with signals received from sensors of the engine system, such as the sensors described above with reference to FIG. 1. The controller may employ engine actuators of the engine system, and various valves described in FIG. 1 to adjust engine operation as well as purging operation, according to the routine described below.

At 902, routine 900 includes determining engine operating parameters. The engine operating parameters may include engine speed, load, fueling conditions (e.g., amount of fuel in fuel tank, whether the fuel system is in a purge mode, etc.), and time since a previous leak detection test was performed. At 904, it may be confirmed that engine-on leak test entry conditions are met. These entry conditions may include, for example, confirming that the engine is running, a threshold duration has elapsed since the most recent engine-on leak test, etc. The leak test may be performed periodically, such as every 100 miles driven. Further, the leak test may be performed only under certain conditions. For example, the leak test may only be performed if the engine temperature is below a threshold, if the fuel system is in standard, non-purge mode, etc. If the leak test entry conditions are not met, routine 900 proceeds to 906 to not activate the engine-on leak test. Further, at 908, an engine-off leak test may be performed, optionally. Therein, the natural vacuum generated due to a drop in engine system and fuel tank temperature following an engine being turned off may be applied on the fuel tank and a change in fuel tank pressure may be monitored to identify a leak. Herein, the VBV may be opened for the engine-off leak test. Specifically, if a fuel tank pressure bleed-up rate (from the vacuum level) while the engine is off is higher than a threshold, a fuel system leak may be determined. Routine 900 then ends.

If entry conditions for the engine-on the leak test are met, for example if a threshold amount of time or distance traveled by the vehicle has elapsed since a previous test was performed, routine 900 proceeds to 910 to adjust the various valves for the leak test. At 912, the CVV may be closed so that the canister (and the fuel system) is sealed from the atmosphere e.g. via vent line 117 in engine system 100. At 914, the CPV may be opened. Further, if a FTIV is present, it is opened as well.

Next, at 916, the engine-on leak test is performed. The engine-on leak test may include applying a negative pressure on the fuel system for a duration (e.g., until a target fuel tank vacuum is reached). Herein, negative pressure generated downstream of an intake throttle in an engine intake may be applied on the fuel system via the CPV. As such, the vacuum may be applied when manifold pressure is lower than barometric pressure, at 918. In another example, ejector vacuum may also be applied on the fuel system for a vacuum test. A second option, at 920, may include applying a positive pressure on the fuel system for a duration (e.g., until a target fuel tank positive pressure is reached). For example, positive pressure generated by a turbocharger in the boosted engine system may be applied on the fuel system. Herein, positive pressure within the intake manifold (e.g., when MAP>BP) may be applied to the canister and the fuel system via the open CPV. It will be noted that if optional check valve 153 is included in purge path 159 of FIG. 1, the positive pressure leak test may not be performed since the optional check valve 153 impedes air flow into the canister. In each of the above options, after application of pressure on the fuel system, the fuel system may be sealed while a change in fuel system pressure (e.g., a rate of change in the vacuum level, or a final pressure value) is monitored. Accordingly, at 922, the various valves are adjusted after a target pressure or vacuum is achieved in the fuel system. Herein, at 924, the CVV may be maintained closed while at 926, each of the CPV and the FTIV are closed. It will be appreciated herein that if the optional check valve 153 is present in purge path 159 of engine system 100, the CPV may be maintained open.

Next, at 928, variations in fuel system pressure are monitored. In one example, the fuel system pressure is a fuel tank pressure estimated by a pressure sensor coupled to the fuel tank or coupled between the fuel tank and the canister of the fuel system. Monitoring the fuel system pressure may include monitoring a rate of change in the fuel tank pressure and/or monitoring a stabilized fuel tank pressure following the application of the pressure.

As such, following isolation of the fuel system, the fuel system pressure (herein, the fuel tank pressure) may be expected to equilibrate back towards atmospheric pressure at a defined rate (based on a reference orifice size). If a leak is present, the monitored fuel tank pressure may be expected to reach to the atmospheric pressure at a faster rate.

Accordingly a rate of change in the fuel tank pressure following application of the pressure may be determined and compared to a threshold rate at 930. If the rate of change in fuel system pressure is larger than the threshold rate, then, at 934, fuel system leak is indicated. Fuel system leak may be indicated by setting a diagnostic code (e.g., by setting a malfunction indication light). Alternatively, if the rate of change in fuel tank pressure is smaller than the threshold, no fuel leak is indicated at 932. As such, the fuel system may be robust.

While the depicted example shows fuel system degradation indicated in response to a rate of change in fuel tank pressure being larger than a threshold (following application of either the positive or negative pressure), in other embodiments, the fuel tank pressure may be allowed to stabilize and the stabilized pressure value may be compared to a reference value, such as a value obtained with a reference orifice. Other leak tests may also be performed to determine a presence of leaks in other embodiments.

The canister vent valve (CVV) coupled to the fuel vapor canister may largely be maintained in an open position enabling fluidic communication between the fuel vapor canister and the atmosphere. However, the CVV may be adjusted closed during boosted conditions to cease purge flow from the fuel vapor canister into the ejector during transient engine conditions when a hydrocarbon load of the fuel vapor canister is higher than a threshold load, e.g., Thresh_H of routine 200. Alternatively, the CVV may also be closed to perform a leak test on the fuel system including the fuel vapor canister. On the other hand, during non-boosted conditions, the CVV may be maintained open while the CPV is opened to enable purge flow through the CPV into the intake manifold, when purge conditions are met. During non-boosted conditions and when purge conditions are met, the CVV may be adjusted closed in response to the leak test alone, since ejector vacuum may be significantly reduced.

Thus, an example method for a boosted engine may comprise, during boosted conditions, flowing stored fuel vapors from a canister into an ejector coupled in a compressor bypass passage, the flowing bypassing a canister purge valve, and responsive to a canister load higher than a threshold load, closing a canister vent valve coupled to the canister, and discontinuing flowing stored fuel vapors from the canister into the ejector. The method may further comprise closing the canister vent valve and discontinuing flowing stored fuel vapors from the canister into the ejector responsive to the canister load higher than the threshold load during deceleration. As such, the canister vent valve may be maintained open during a tip-in event when the canister load is higher than the threshold load. As mentioned earlier, tip-in events with their higher engine air flow rates can absorb higher fuel vapor concentrations in purge flow into the ejector. The method may also comprise opening the canister vent valve and initiating flowing of stored fuel vapors from the canister into the ejector responsive to steady state driving conditions, the steady state driving conditions including cruising conditions. Alternatively, the method may further comprise opening the canister vent valve and initiating flowing of stored fuel vapors from the canister responsive to purging conditions being met.

During non-boosted conditions, the method may additionally comprise flowing stored fuel vapors from the canister into an intake manifold via the canister purge valve, and not flowing stored fuel vapors from the canister into the ejector. Further, the method may comprise closing the canister vent valve in response to a leak test of an evaporative emissions system of the boosted engine, and discontinuing flowing of stored fuel vapors from the canister (as described in reference to routine 900 of FIG. 9). During boosted conditions, the flowing of stored fuel vapors may bypass the canister purge valve when manifold pressure is higher than a pressure in the canister. Further, during boosted conditions, when manifold pressure is lower than the pressure in the canister, the method may include opening the canister purge valve and flowing additional stored fuel vapors from the canister via the canister purge valve. Herein, stored fuel vapors from the canister may flow into the ejector at the same time as the additional stored fuel vapors flow from the canister into the intake manifold via the canister purge valve. Flowing the stored fuel vapors from the canister into the ejector during boosted conditions may also include directing the stored fuel vapors to an inlet of a compressor.

Turning now to FIG. 10, it includes map 1000 depicting an example control operation of the CVV based on purging and engine conditions in the example engine system 100 of FIG. 1 in accordance with the present disclosure. Map 1000 includes an indication of purge flow through the CPV at plot 1002, an indication of purge flow through the aspirator at plot 1004, a position of the CVV at plot 1006, CPV status at plot 1008, canister load at plot 1010, intake manifold pressure (MAP) at plot 1016, boost pressure as measured by throttle inlet pressure sensor at plot 1014 (dashed plot), performance of a leak test for a fuel system at plot 1018, engine speed at 1020, and pedal position at plot 1022. All the above are plotted against time on the x-axis and time increases from the left to the right along the x-axis. Further, line 1009 represents the threshold load for the canister such as Thresh_H of routine 200, (for determining a substantially saturated canister), and line 1013 represents atmospheric pressure. As mentioned earlier, canister pressure may be substantially equivalent to atmospheric pressure. Therefore, line 1013 may also represent canister pressure.

Between t0 and t1, the accelerator pedal may be partly depressed (plot 1022), and the engine may be at steady-state cruising conditions (plot 1020) while being boosted as shown by boost pressure (plot 1014) substantially higher than atmospheric pressure (line 1013). Intake manifold pressure may be at or slightly lower than boost pressure, during these boosted conditions. Since the engine is at cruising conditions and is boosted, the CVV is open and purged vapors may stream to the ejector (plot 1004). Accordingly, canister load decreases gradually from slightly above the threshold load (line 1009). Since manifold pressure is higher than canister pressure between t0 and t1, the CPV is closed and purged vapors may not follow via the CPV.

At t1, a deceleration (also termed tip-out, herein) event may occur as the pedal is released from partly depressed to slightly depressed (plot 1022). Correspondingly, a sharp decrease in torque demand may occur. As such, the tip-out event occurs from steady-state cruising conditions. In response to the tip-out event, the engine speed may decrease as does the boost pressure. Since the canister load is substantially at the threshold load (line 1009), the CVV is adjusted closed in response to the deceleration event at t1. Thus, rich fuel vapors from the canister may not be received at the compressor inlet via the ejector, and canister load may remain steady between t1 and t2. Further, the CPV may also be maintained closed during the tip-out event to reduce fueling errors and canister purging may not occur either via the ejector or via the CPV between t1 and t2. In this way, the CVV may be closed to terminate purge through the ejector during engine conditions with lower air flow rates (such as deceleration) when canister load is at or higher than the threshold load, Thresh_H or line 1009.

At t2, a tip-in event may occur as the pedal is fully depressed following the deceleration event at t1. In response to the tip-in, a sudden rise in torque demand may occur resulting in an increase in engine speed and boost pressure at t2. Since the tip-in event involves increased engine air flow rates, the saturated canister may be purged into the ejector. As such, the engine may tolerate receiving the rich vapor purge during tip-in events. Further, the boosted conditions enable generation of vacuum at the ejector which draws in stored fuel vapors from the canister into the suction port. Accordingly, canister load decreases after t2. Purge flow may not occur via the CPV during tip-in events.

At t3, the pedal may be released partly and a steady-state driving condition may ensue. Boost pressure and engine speed may reduce gradually to medium levels after t3. In response to the steady-state conditions, the CVV may be maintained open to allow ejector vacuum to draw stored fuel vapors from the canister into the compressor inlet. Vacuum may be generated at the aspirator due to the flow of compressed air therethrough as motive flow. Canister purge via ejector vacuum results in a corresponding decrease in canister load between t3 and t4. Since the intake manifold pressure (plot 1016) is higher than canister pressure between t3 and t4, the CPV may be maintained closed and purge flow may not occur via the CPV.

At t4, a leak test may be initiated. For example, a threshold duration may have elapsed since the previous leak test. Since the engine is boosted, a positive pressure engine-on leak test may be performed at t4. The positive pressure engine-on leak test may be performed in engine systems which do not include optional check valve 153 in purge path 159 (referring to FIG. 1). The CVV is closed at t4 and simultaneously the CPV is opened. Thus, as shown between t0 and t5, the CVV may be adjusted to a fully closed position in response to one of a canister load higher than a threshold load (such as at t1) during deceleration conditions and a leak test of the fuel system (such as at t4). Manifold pressure may be applied to the fuel system including the canister during the positive pressure leak test. After a threshold positive pressure is reached in the fuel system, the CPV is closed, as shown at 1007. Each of the CVV and the CPV is maintained closed until t5 when the leak test is concluded. Since the CVV is closed at t4, canister load may not change after t4 until the CVV is opened next.

At t5, the leak test is ended, and the pedal is released for an impending vehicle slow down resulting in a gradual decrease in engine speed and boost pressure. The deceleration event at t5 may reduce fueling demand. Further, air-fuel ratio may be controlled in a more accurate manner. Thus, to reduce intake of additional fuel vapors from the canister and/or supplementary air flow from the canister into the intake, the CVV is closed or maintained closed at t5. Similarly, the CPV may also be maintained closed following the leak test.

At t6, a key-off event may occur in anticipation of a refueling event. Herein, the engine is shut down and at rest as the vehicle is refueled. In response to the refueling event at t6, the CVV is opened. The FTIV, if present, may also be opened (not shown). Additionally, the CPV is closed. The fuel tank may be evacuated of fuel vapors prior to the beginning of refueling, as described in routine 700. Further, during refueling (between t6 and t7), the fuel system canister load rises steadily as refueling vapors from the fuel tank are captured in the canister. Thus, when the engine is activated and operational (e.g., a vehicle key-on event) at t7, canister load may be higher than at t6. In particular, the canister load may be at (or slightly above) the threshold load (line 1009).

Between t7 and t8, the engine may be idling and a purging operation may be commenced by opening the CPV. The engine start at t7 may be a hot start wherein an emissions catalyst may have attained light-off temperature. Further, intake manifold pressure may be lower than atmospheric (at vacuum), and can draw purge vapors into the intake manifold via the CPV. Accordingly, purging via the CPV may be initiated at t7. The CVV is maintained open to draw fresh air into the canister to enable desorption of stored fuel vapors. Manifold vacuum may be applied to the fuel system canister to draw stored vapors into the intake manifold. Since this is a non-boosted condition, ejector vacuum may not be produced, and purged vapors may only flow via the CPV and not via the ejector. Canister load may decrease in the duration between t7 and t8.

Next, at t8, the pedal may be depressed gradually to increase engine speed. For example, vehicle movement may be initiated from a stop light. Since the increase in torque demand is gradual, the engine speed also rises gradually and boost pressure increases adequately. However, intake manifold pressure may rise to about atmospheric or may remain slightly below atmospheric. Therefore, the CPV may be closed from open and canister purge via the CPV may be ceased. As such, vacuum in the intake manifold may not be sufficient to draw desorbed fuel vapors from the canister. Since vacuum may now be generated at the ejector with the smaller levels of boost, purge flow may occur through the ejector. The CVV is maintained open to enable purge through the ejector. As such, the engine air flow rates may be sufficiently high to tolerate the rich vapor purge. Thus, between t8 and t9, purge flow may occur through the ejector alone, and consequently canister load decreases.

At t9, the pedal may be released gradually to a moderate position and engine speed may simultaneously fall. For example, the vehicle may be operating on city streets. Boost pressure may decrease after t9 to atmospheric pressure. Accordingly, the engine may not be boosted after t9 and ejector vacuum may not be produced after t9. In response to the lack of ejector vacuum after t9, purge flow through the ejector may cease.

As boost pressure reduces, a concurrent reduction in intake manifold pressure (plot 1016) is observed after t9. Therefore, intake manifold pressure may be sufficiently low to draw purged vapors from the canister. In response to relatively deeper levels of vacuum in the intake manifold after t9, the CPV may now be opened to enable purge flow into the intake manifold. Therefore, purge flow may now occur via the CPV as the CVV is maintained open.

At t10, another leak test may be initiated. In response, the CVV is closed and the CPV is maintained open. Since the intake manifold is at a negative pressure at t10 (e.g., lower than atmospheric), manifold vacuum may be applied on the fuel system for an engine-on negative pressure leak test. Once a desired vacuum is applied on the fuel system, the CPV is closed, as shown at 1011. The leak test may be completed at t11. Pedal position may remain the same after t9. Accordingly, the engine may continue as non-boosted with a lower intake manifold pressure (e.g. lower than atmospheric) after t11. Therefore, purge flow through the CPV may be enabled again by opening the CPV at t11. Simultaneously, the CVV may also be opened. Since boost pressure is at or near atmospheric pressure at t11, purge vapors may not flow into the ejector as ejector vacuum may not be generated. Accordingly, after t11, the canister may be primarily purged via the CPV and not via the ejector.

Thus, after t9 the engine may be operating with intake manifold pressure being lower than atmospheric (e.g., non-boosted condition). As shown, during non-boosted conditions, the CVV may primarily be maintained open except when a leak test is commanded at t10. Purge flow into the intake manifold during non-boosted conditions may be controlled via the CPV.

Thus, an example method for a boosted engine may comprise, during boosted conditions, maintaining open a canister vent valve, flowing stored fuel vapors from a canister in a fuel system into an ejector coupled in a compressor bypass passage, and adjusting the canister vent valve to a fully closed position in response to one of a canister load higher than a threshold load (such as at t1 of map 1000) and a leak test of the fuel system (such as at t4). The method may further comprise adjusting the canister vent valve to the fully closed position in response to the canister load higher than the threshold load during deceleration conditions (such as at t1). The method may also comprise during non-boosted conditions (after t9 in map 1000), maintaining open the canister vent valve, opening a canister purge valve, flowing stored fuel vapors from the canister into an intake manifold via the canister purge valve, and adjusting the canister vent valve to the fully closed position in response to the leak test of the fuel system (such as at t10). The leak test of the fuel system includes a positive pressure engine-on leak test during boosted conditions and a negative pressure engine-on leak test during non-boosted conditions. During non-boosted conditions, stored fuel vapors may flow from the canister into the intake manifold via the canister purge valve while bypassing the ejector in the compressor bypass passage. During boosted conditions when a pressure in the intake manifold is higher than a pressure in the canister, stored fuel vapors may flow from the canister into the ejector while bypassing the canister purge valve. The method may further comprise during boosted conditions when the pressure in the intake manifold is lower than the pressure in the canister, flowing a first portion of stored fuel vapors from the canister into the ejector coupled in the compressor bypass passage, and flowing a second portion of stored fuel vapors from the canister into the intake manifold via the canister purge valve.

Further, an example system may comprise an engine, an intake manifold, an intake throttle, a boost device including a compressor, the compressor positioned in an intake passage upstream of the intake throttle, a canister purge valve comprising a solenoid valve and a sonic choke, the sonic choke coupled immediately downstream of the solenoid valve, an inlet of the sonic choke fluidically coupled to an outlet of the solenoid valve, an outlet of the sonic choke fluidically coupled to the intake manifold downstream of the intake throttle, an ejector coupled in a compressor bypass passage, the compressor bypass passage not including a shut-off valve, a motive inlet of the ejector coupled to the intake passage downstream of the compressor, a motive outlet of the ejector coupled to the intake passage upstream of the compressor, an evaporative emissions system including a fuel vapor canister, the fuel vapor canister fluidically communicating with each of an inlet of the canister purge valve and a suction port of the ejector, a canister vent valve fluidically coupling the fuel vapor canister to atmosphere, and a controller with instructions in non-transitory memory and executable by a processor for during boosted conditions when pressure in the intake manifold is higher than barometric pressure, generating vacuum at the suction port of the ejector via motive flow, drawing fresh air into the fuel vapor canister via the canister vent valve, and purging fuel vapors from the fuel vapor canister into the suction port of the ejector, and responsive to each of deceleration conditions and a load of the fuel vapor canister being higher than a threshold load, closing the canister vent valve to cease drawing fresh air into the fuel vapor canister, and discontinuing purging fuel vapors from the fuel vapor canister into the suction port of the ejector. The controller may include further instructions for during non-boosted conditions when pressure in the intake manifold is lower than barometric pressure, opening the canister purge valve, drawing fresh air into the fuel vapor canister via the canister vent valve, and purging fuel vapors from the fuel vapor canister into the intake manifold via the canister purge valve. The controller may also include further instructions for closing the canister vent valve to cease drawing fresh air into the fuel vapor canister in response to initiating a leak test of the evaporative emissions system.

In this way, a canister in a boosted engine may be purged during boosted and non-boosted conditions. By providing a plurality of purge paths, a frequency of canister purge may be increased. Further, in a system where motive flow through the ejector is not actively controlled, the canister vent valve may be used to control purge flow into the ejector. Purge flow into the ejector may be ceased by closing the canister vent valve when canister load is higher than a threshold load during conditions with lower engine air flow rates. Thus, adverse effects of fueling errors may be reduced and engine performance may be maintained. Further, by using an existing solenoid valve such as the CVV for purge flow control, additional control valves may not be desired, allowing a reduction in costs.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
   during boosted conditions,
      flowing stored fuel vapors from a canister into an ejector coupled in a compressor bypass passage, the flowing bypassing a canister purge valve; and
      responsive to a canister load higher than a threshold load,
         closing a canister vent valve coupled to the canister; and
         discontinuing flowing stored fuel vapors from the canister into the ejector.

2. The method of claim 1, further comprising closing the canister vent valve and discontinuing flowing stored fuel vapors from the canister into the ejector responsive to the canister load higher than the threshold load during and in response to deceleration.

3. The method of claim 2, wherein the canister vent valve is maintained open during a tip-in event in response to the canister load being higher than the threshold load.

4. The method of claim 2, further comprising opening the canister vent valve and initiating flowing of stored fuel vapors from the canister into the ejector responsive to steady state driving conditions, the steady state driving conditions including cruising conditions.

5. The method of claim 2, further comprising opening the canister vent valve and initiating flowing of stored fuel vapors from the canister responsive to purging conditions being met.

6. The method of claim 5, further comprising:
   during non-boosted conditions,
      flowing stored fuel vapors from the canister into an intake manifold via the canister purge valve; and
      not flowing stored fuel vapors from the canister into the ejector.

7. The method of claim 6, further comprising closing the canister vent valve in response to a leak test of an evaporative emissions system of the boosted engine, and discontinuing flowing of stored fuel vapors from the canister.

8. The method of claim 1, wherein, during boosted conditions, the flowing of stored fuel vapors bypasses the canister purge valve when manifold pressure is higher than a pressure in the canister.

9. The method of claim 8, further comprising, during boosted conditions and when manifold pressure is lower than the pressure in the canister, opening the canister purge valve and flowing additional stored fuel vapors from the canister via the canister purge valve.

10. The method of claim 9, wherein stored fuel vapors from the canister flow into the ejector concurrently with the additional stored fuel vapors flow from the canister into an intake manifold via the canister purge valve, and wherein flowing the stored fuel vapors from the canister into the ejector during boosted conditions includes directing the stored fuel vapors to an inlet of a compressor.

11. A method for a boosted engine, comprising:
  during boosted conditions,
    maintaining open a canister vent valve;
    flowing stored fuel vapors from a canister of an evaporative emissions system into an ejector coupled in a compressor bypass passage; and
    adjusting the canister vent valve to a fully closed position in response to one of a canister load higher than a threshold load and a leak test of the evaporative emissions system.

12. The method of claim 11, further comprising adjusting the canister vent valve to the fully closed position in response to the canister load higher than the threshold load during deceleration conditions.

13. The method of claim 11, further comprising:
  during non-boosted conditions,
    maintaining open the canister vent valve;
    opening a canister purge valve;
    flowing stored fuel vapors from the canister into an intake manifold via the canister purge valve; and
    adjusting the canister vent valve to the fully closed position in response to the leak test of the evaporative emissions system.

14. The method of claim 13, wherein the leak test of the evaporative emissions system includes a positive pressure engine-on leak test during boosted conditions and a negative pressure engine-on leak test during non-boosted conditions.

15. The method of claim 13, wherein, during non-boosted conditions, stored fuel vapors flowing from the canister into the intake manifold via the canister purge valve bypass the ejector in the compressor bypass passage.

16. The method of claim 15, wherein, during boosted conditions when a pressure in the intake manifold is higher than a pressure in the canister, stored fuel vapors flow from the canister into the ejector while bypassing the canister purge valve.

17. The method of claim 16, further comprising:
  during boosted conditions when the pressure in the intake manifold is lower than the pressure in the canister,
    flowing a first portion of stored fuel vapors from the canister into the ejector coupled in the compressor bypass passage; and
    flowing a second portion of stored fuel vapors from the canister into the intake manifold via the canister purge valve.

18. A system, comprising:
  an engine;
  an intake manifold;
  an intake throttle;
  a boost device including a compressor, the compressor positioned in an intake passage upstream of the intake throttle;
  a canister purge valve comprising a solenoid valve and a sonic choke, the sonic choke coupled immediately downstream of the solenoid valve;
  an inlet of the sonic choke fluidically coupled to an outlet of the solenoid valve;
  an outlet of the sonic choke fluidically coupled to the intake manifold downstream of the intake throttle;
  an ejector coupled in a compressor bypass passage, the compressor bypass passage not including a shut-off valve;
  a motive inlet of the ejector coupled to the intake passage downstream of the compressor;
  a motive outlet of the ejector coupled to the intake passage upstream of the compressor;
  an evaporative emissions system including a fuel vapor canister, the fuel vapor canister fluidically communicating with each of an inlet of the canister purge valve and a suction port of the ejector;
  a canister vent valve fluidically coupling the fuel vapor canister to atmosphere; and
  a controller with instructions in non-transitory memory and executable by a processor for:
    during boosted conditions when pressure in the intake manifold is higher than barometric pressure,
      generating vacuum at the suction port of the ejector via motive flow;
      drawing fresh air into the fuel vapor canister via the canister vent valve;
      purging fuel vapors from the fuel vapor canister into the suction port of the ejector; and
      responsive to each of deceleration conditions and a load of the fuel vapor canister being higher than a threshold load:
        closing the canister vent valve to cease drawing fresh air into the fuel vapor canister; and
        discontinuing purging fuel vapors from the fuel vapor canister into the suction port of the ejector.

19. The system of claim 18, wherein the controller includes further instructions for, during non-boosted conditions when pressure in the intake manifold is lower than barometric pressure, opening the canister purge valve; drawing fresh air into the fuel vapor canister via the canister vent valve; and purging fuel vapors from the fuel vapor canister into the intake manifold via the canister purge valve.

20. The system of claim 19, wherein the controller includes further instructions for closing the canister vent valve to cease drawing fresh air into the fuel vapor canister in response to initiating a leak test of the evaporative emissions system.

* * * * *